US011668967B2

(12) United States Patent
Yoshida et al.

(10) Patent No.: US 11,668,967 B2
(45) Date of Patent: *Jun. 6, 2023

(54) DISPLAY DEVICE AND MIRROR DEVICE

(71) Applicant: Japan Display Inc., Tokyo (JP)

(72) Inventors: Koji Yoshida, Tokyo (JP); Hirofumi Ohira, Tokyo (JP); Soichiro Ohama, Tokyo (JP); Naoki Takada, Tokyo (JP); Takayuki Nakanishi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,751

(22) Filed: Jan. 5, 2022

(65) Prior Publication Data

US 2022/0128852 A1  Apr. 28, 2022

Related U.S. Application Data

(63) Continuation of application No. 17/167,087, filed on Feb. 4, 2021, now Pat. No. 11,249,335, which is a (Continued)

(30) Foreign Application Priority Data

Sep. 11, 2018  (JP) .............................. JP2018-170053

(51) Int. Cl.
  *G02F 1/1333*  (2006.01)
  *G02F 1/1343*  (2006.01)
  (Continued)

(52) U.S. Cl.
  CPC .......... *G02F 1/13338* (2013.01); *G02F 1/137* (2013.01); *G02F 1/13439* (2013.01);
  (Continued)

(58) Field of Classification Search
  CPC ........... G02F 1/13338; G02F 1/134327; G02F 1/13439; G02F 1/137; G02F 1/155; G02F 1/163
  (Continued)

(56) References Cited

U.S. PATENT DOCUMENTS 11,249,335 B2 *  2/2022  Yoshida ................ G06F 3/0445
2014/0166464 A1   6/2014  Fix et al.
(Continued)

FOREIGN PATENT DOCUMENTS

JP    2001-318374 A    11/2001
JP    2018-22142 A     2/2018

OTHER PUBLICATIONS

International Search Report and Written Opinion dated Sep. 17, 2019, received for PCT Application PCT/JP2019/031868, Filed on Aug. 13, 2019, 10 pages including English Translation.
(Continued)

*Primary Examiner* — Edward J Glick
*Assistant Examiner* — William D Peterson
(74) *Attorney, Agent, or Firm* — Xsensus LLP

(57) ABSTRACT

The display device includes a display panel and a front surface panel that is superimposed with the display panel, and that is switched between a reflective state in which incident light is reflected and a transmissive state in which incident light is transmitted. The front surface panel can detect presence of an object to be detected.

14 Claims, 19 Drawing Sheets

Related U.S. Application Data continuation of application No. PCT/JP2019/031868, filed on Aug. 13, 2019.

(51) Int. Cl.
  *G02F 1/137* (2006.01)
  *G02F 1/155* (2006.01)
  *G02F 1/163* (2006.01)

(52) U.S. Cl.
  CPC ........ *G02F 1/134327* (2013.01); *G02F 1/155* (2013.01); *G02F 1/163* (2013.01)

(58) Field of Classification Search
  USPC .......................................... 349/12
  See application file for complete search history.

(56) References Cited

U.S. PATENT DOCUMENTS

2017/0344166 A1* 11/2017 Nam .................... G06F 3/0443
2018/0024409 A1   1/2018 Yasumoto

OTHER PUBLICATIONS

Office Action dated Nov. 4, 2022 in German Patent Application No. 11 2019 004 079.0, 14 pages.

* cited by examiner

DISPLAY DEVICE AND MIRROR DEVICE

CROSS-REFERENCE TO RELATED APPLICATIONS

This application is a continuation of U.S. application Ser. No. 17/167,087, filed Feb. 4, 2021, which is a continuation on PCT filing PCT/JP2019/031868, filed Aug. 13, 2019, and claims priority to Japanese Application No. 2018-170053, filed Sep. 11, 2018, the entire contents of each are incorporated herein by reference.

BACKGROUND

1. Technical Field

The present disclosure relates to a display device and a mirror device capable of displaying an image both in a reflective state in which incident light is reflected, and in a transmissive state in which incident light is transmitted.

2. Description of the Related Art

Japanese Patent Application Laid-open Publication No. 2001-318374 A discloses a device that can be switched between a display state in which an image is displayed, and a mirror state (reflective state) in which a reflected image is obtained.

In the display device of Japanese Patent Application Laid-open Publication No. 2001-318374 A, when a touch panel is further placed thereon, the reflectivity in the reflective state may be lowered.

SUMMARY

An object of the present disclosure is to provide a display device and a mirror device that can prevent reflectivity in the reflective state from lowering, and that can detect a nearby object.

A display device according to one embodiment of the present disclosure comprising: a display panel; and a front surface panel that is superimposed with the display panel, and that is switched between a reflective state in which incident light is reflected and a transmissive state in which incident light is transmitted, wherein the front surface panel is capable of detecting presence of an object to be detected.

A mirror device according to another embodiment of the present disclosure capable of displaying an image both in a reflective state in which incident light is reflected and in a transmissive state in which incident light is transmitted, the mirror device comprising: a display device; and an image pickup device that picks up the image, and the display device comprising: a display panel; and a front surface panel that is superimposed with the display panel, and that is switched between a reflective state in which incident light is reflected and a transmissive state in which incident light is transmitted, wherein the front surface panel is capable of detecting presence of an object to be detected.

DETAILED DESCRIPTION

Figure 1:
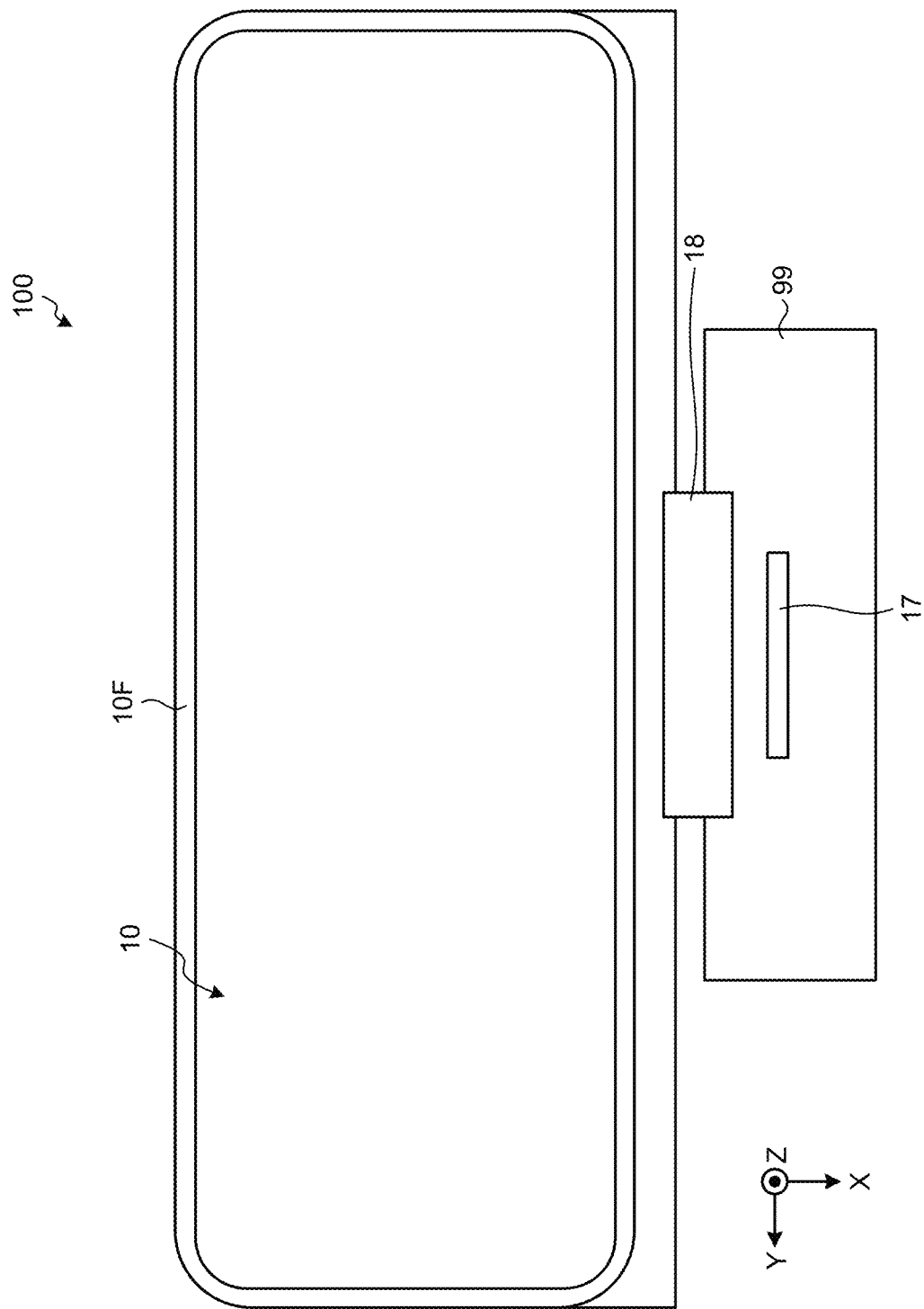
FIG. 1 is a schematic plan view for explaining an active region of a display device of a first embodiment.

Modes (embodiments) for carrying out the present disclosure will be described in detail with reference to the accompanying drawings. It is not intended that the present disclosure be limited by what has been described in the following embodiments. Components described below include components that can be easily assumed by those skilled in the art, and components substantially the same. Components described below can also be combined with one another as appropriate. The disclosure is merely an example, and the present disclosure naturally encompasses an appropriate modification maintaining the gist of the disclosure that is easily conceivable by those skilled in the art. To further clarify the description, a width, a thickness, a shape, and the like of each component may be schematically illustrated in the drawings as compared with an actual aspect. However, this is merely an example, and interpretation of the present disclosure is not limited thereto. The same element as that described in the drawing that has already been discussed is denoted by the same reference numeral throughout the present specification and the drawings, and detailed description thereof may be omitted as appropriate.

First Embodiment

FIG. 1 is a schematic plan view for explaining an active region of a display device of a first embodiment. As illustrated in FIG. 1, there is an active region 10 that can be switched between a display state in which an image is displayed and a mirror state (reflective state) in which a reflected image is obtained, and a frame region 10F at the periphery of the active region 10.

Figure 2:
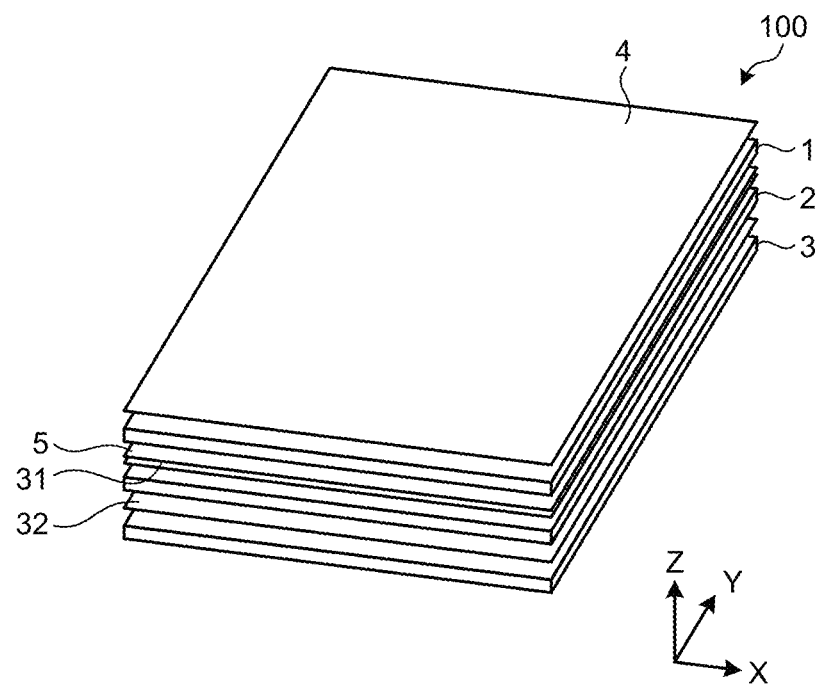
FIG. 2 is a perspective view illustrating an example of a configuration of the display device of the first embodiment.

FIG. 2 is a perspective view illustrating an example of a configuration of the display device of the first embodiment. A display device 100 includes a first polarizing member 4, a front surface panel 1, an optical sheet 5, a second polarizing member 31, a display panel 2, a third polarizing member 32, and a backlight 3. In FIG. 2, one direction on a plane of the display panel 2 is referred to as an X direction, a direction orthogonal to the X direction on the plane of the display panel 2 is referred to as a Y direction, and a direction orthogonal to the X-Y plane is referred to as a Z direction. A display surface side (or an upper surface side) is a side of a display surface (or an upper surface) where the display panel 2 displays an image when viewed in the Z direction, and a rear surface side (or a lower surface side) is a side of a rear surface (or a lower surface) opposite to the display surface (or the upper surface) when viewed in the Z direction.

When viewed in the Z direction, in the rear surface side of the display panel 2, the third polarizing member 32 and the backlight 3 are overlapped with the display panel 2.

The backlight 3 is a lighting device that emits light toward the display panel 2. For example, the backlight 3 includes a light source and a light guide plate, and outputs light from a light emission surface that faces the display panel 2, while scattering the light emitted from the light source with the light guide plate. The backlight 3 may also include a prism sheet and a diffusion sheet between the light guide plate and the third polarizing member 32.

In the Z direction, in the display surface side of the display panel 2, the first polarizing member 4, the front surface panel 1, the optical sheet 5, and the second polarizing member 31 are overlapped with the display panel 2 in this order. In this manner, the front surface panel 1 is superimposed with the display panel 2.

Figure 3:
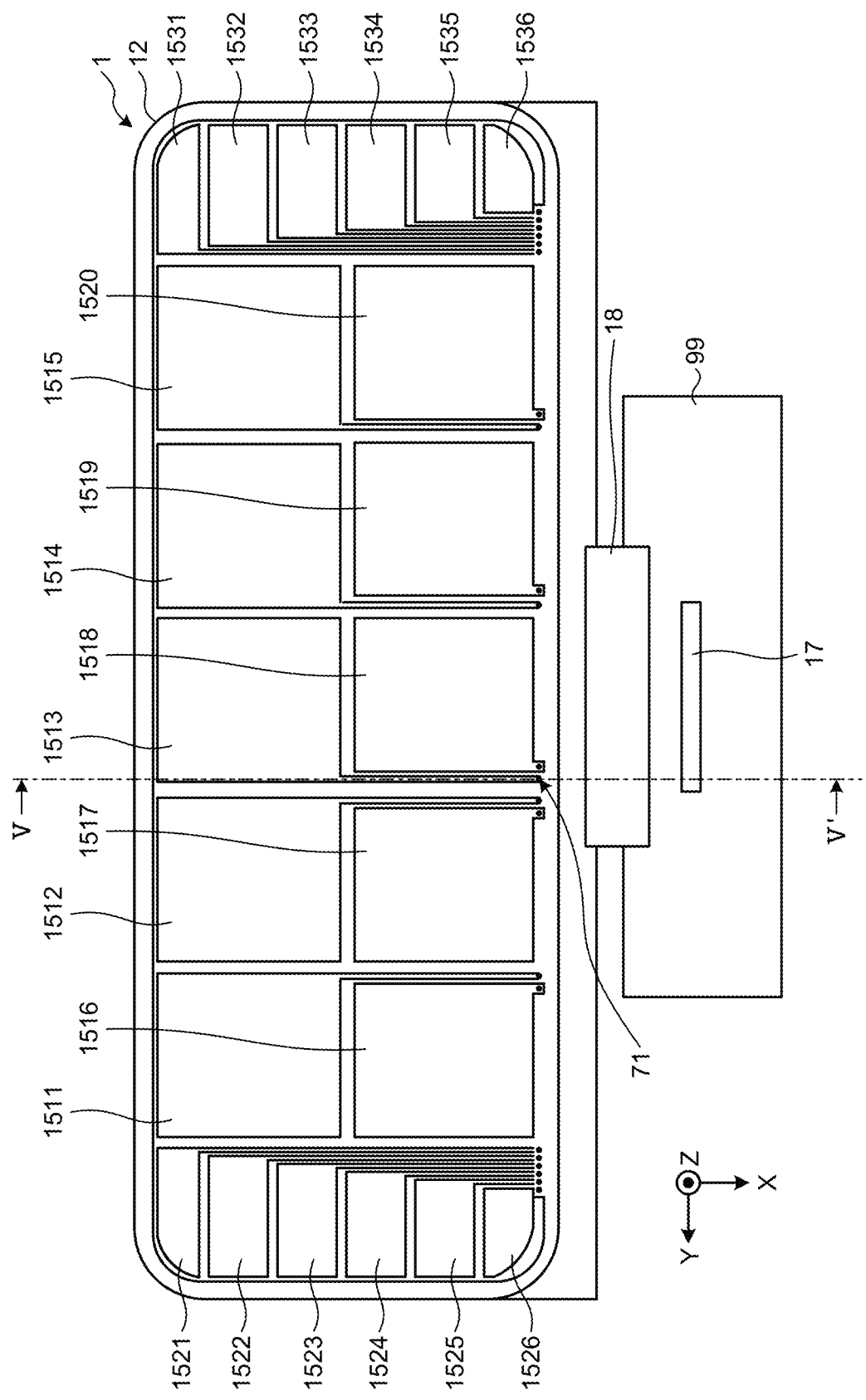
FIG. 3 is a plan view illustrating a second translucent electrode of the display device of the first embodiment.
Figure 4:
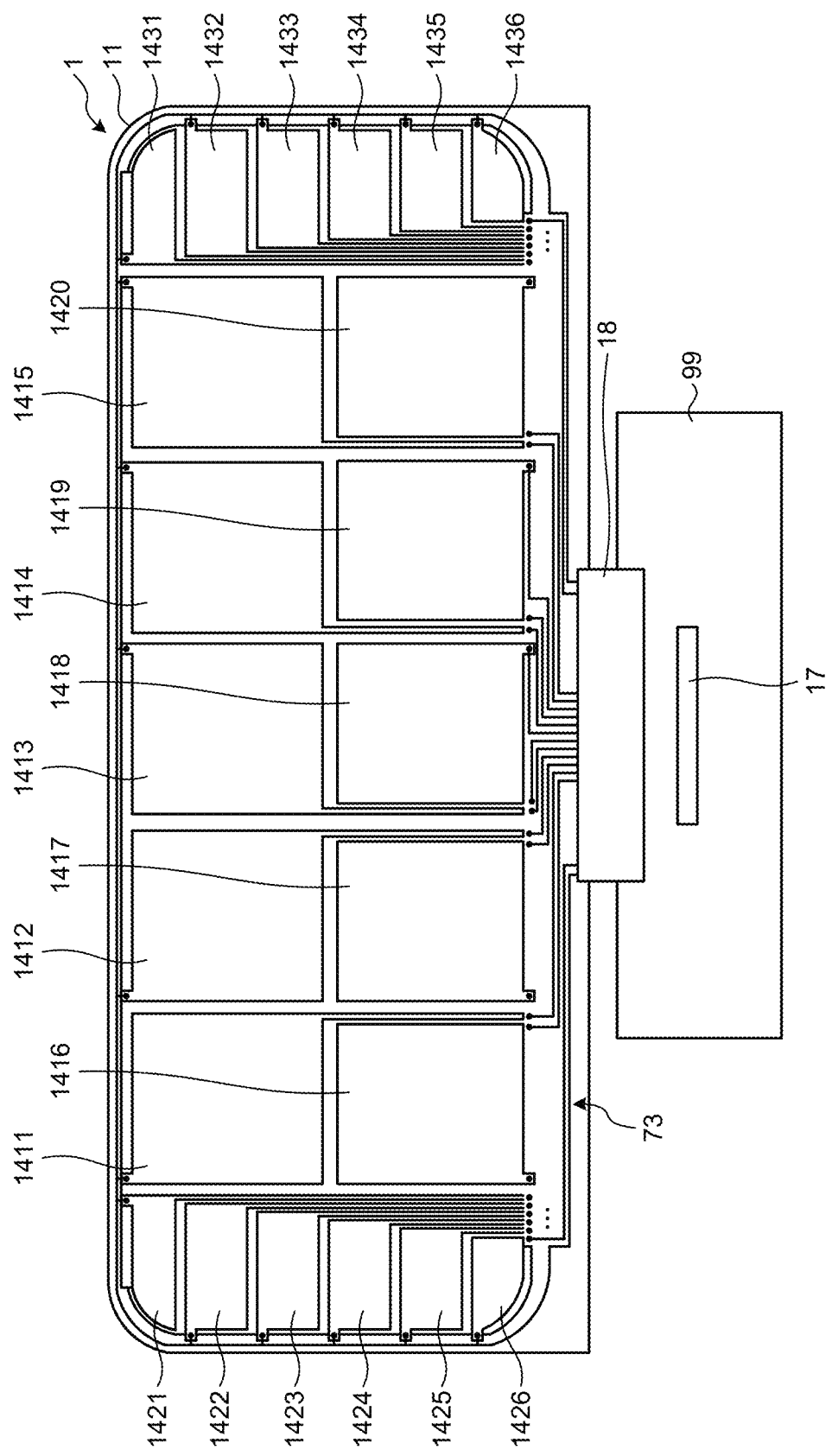
FIG. 4 is a plan view illustrating a first translucent electrode of the display device of the first embodiment.
Figure 5:
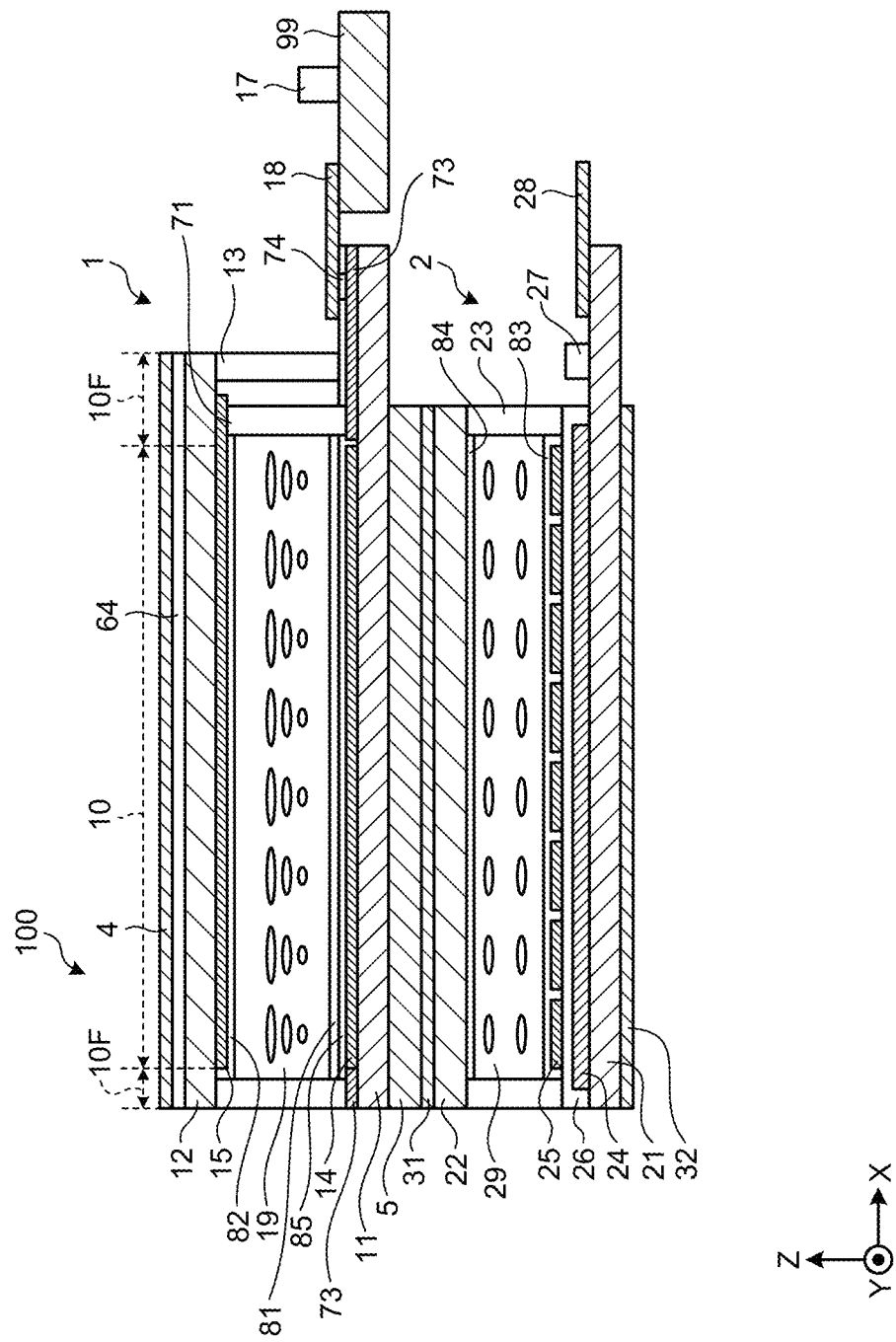
FIG. 5 is a sectional view of the display device of the first embodiment.

FIG. 3 is a plan view illustrating a second translucent electrode of the display device of the first embodiment. FIG. 4 is a plan view illustrating a first translucent electrode of the display device of the first embodiment. FIG. 5 is a sectional view of the display device of the first embodiment. As illustrated in FIG. 3, a second translucent electrode 15 illustrated in FIG. 5 is divided into second translucent electrodes 1511 to 1526, and 1531 to 1536. Hereinafter, when it is indicated as the second translucent electrode 15, the second translucent electrode 15 refers to all of the second translucent electrodes 1511 to 1526, and 1531 to 1536. The second translucent electrode 15 is overlapped with the active region 10 illustrated in FIG. 1.

As illustrated in FIG. 4, a first translucent electrode 14 illustrated in FIG. 5 is divided into first translucent electrodes 1411 to 1426, and 1431 to 1436. Hereinafter, when it is indicated as the first translucent electrode 14, the first translucent electrode 14 refers to all of the first translucent electrodes 1411 to 1426, and 1431 to 1436. As illustrated in FIG. 3, the first translucent electrodes 1411 to 1426, and 1431 to 1436 are each coupled to a drive circuit 17 mounted on a printed circuit board 99, via a flexible printed circuit board (FPC) 18. The first translucent electrode 14 is overlapped with the active region 10 illustrated in FIG. 1.

Figure 6:
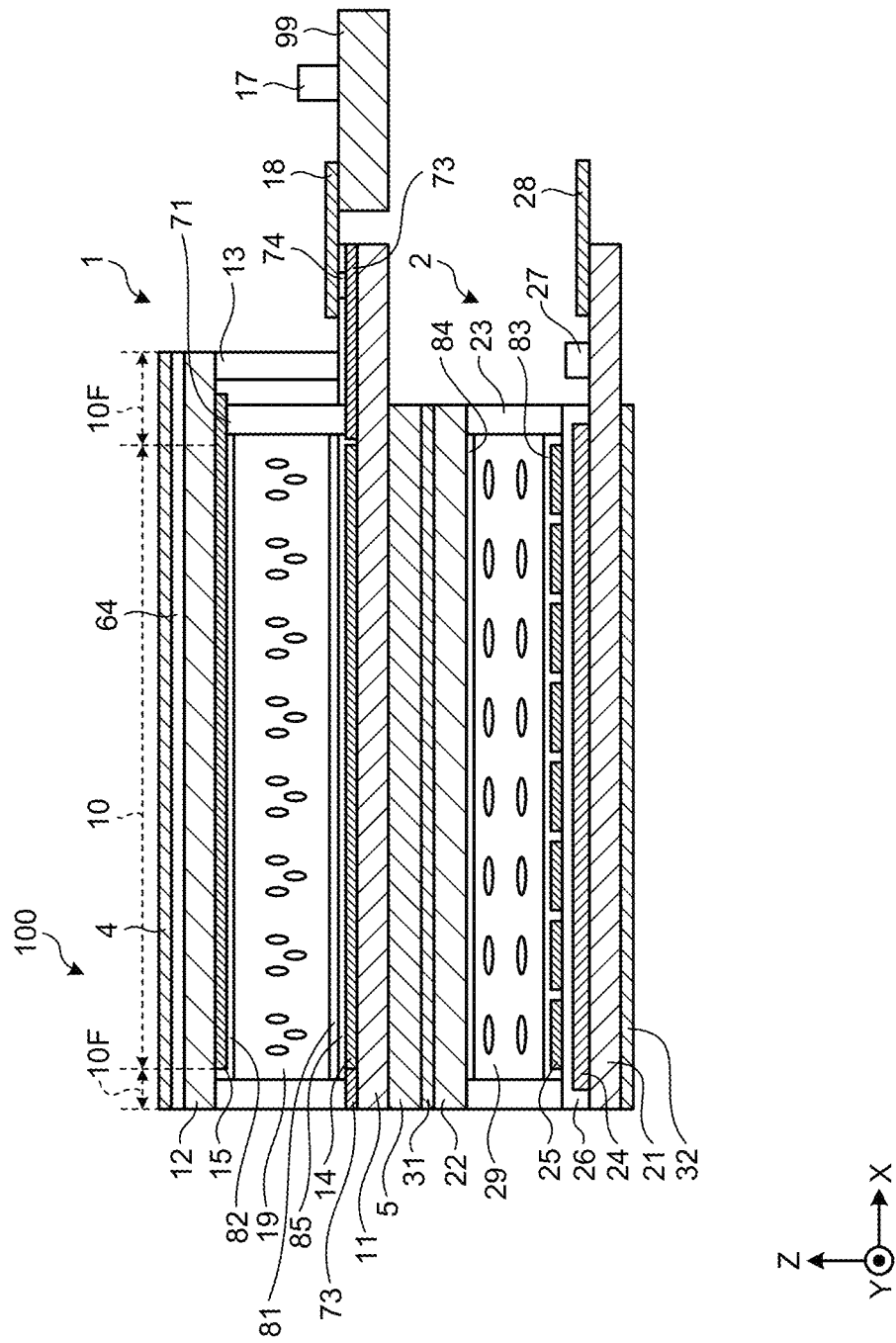
FIG. 6 is a sectional view of the display device of the first embodiment.

FIG. 5 is a diagram illustrating the display device 100 in a display state in which an image is displayed. FIG. 6 is a sectional view of the display device of the first embodiment. FIG. 6 is a diagram illustrating the display device 100 in a reflective state in which incident light is reflected. The cross-sections of FIG. 5 and FIG. 6 are schematic cross-sections taken along a line V-V' illustrated in FIG. 3.

As illustrated in FIG. 5 and FIG. 6, the display panel 2 is what is called a liquid crystal display device. The display panel 2 includes a translucent substrate 21, a translucent substrate 22, and a liquid crystal layer 29 sealed between the substrate 21 and the substrate 22 with a sealing layer 23. The display panel 2 is not limited to the liquid crystal display device, and may also be an electro-luminescence (EL) type display device and the like.

The liquid crystal layer 29 modulates light that passes through the liquid crystal layer 29, depending on the state of an electric field. In the liquid crystal layer 29 of the first embodiment, for example, a horizontal electric field mode such as fringe field switching (FFS), which is one mode of in-plane switching (IPS), is used. However, it is not limited thereto, and a vertical electric field mode may also be used. For example, liquid crystals of various modes such as twisted nematic (TN), vertical alignment (VA), and electrically controlled birefringence (ECB) may also be used.

Figure 7:
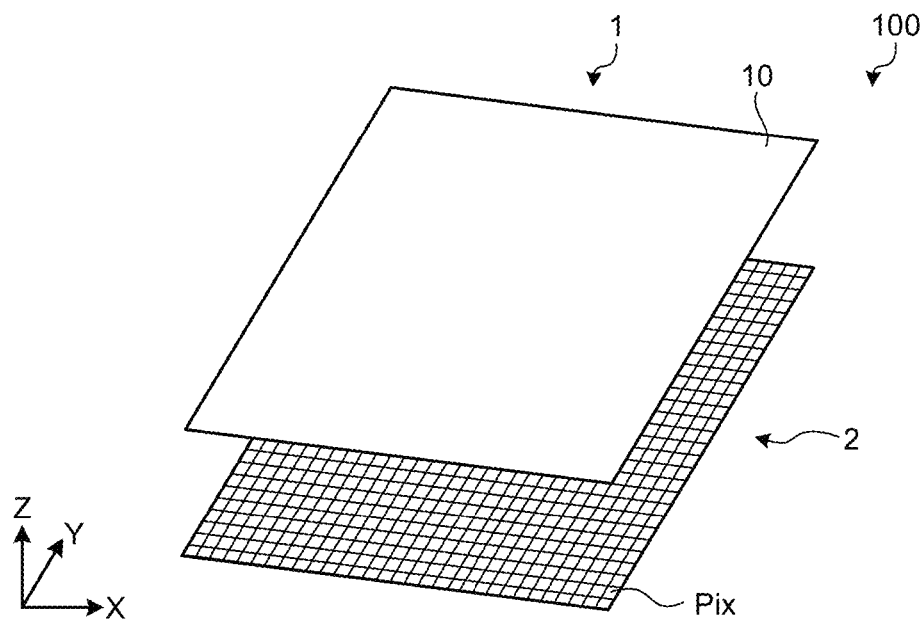
FIG. 7 is an explanatory diagram for schematically comparing and explaining the size of pixels in a display panel and the size of the second translucent electrode.

FIG. 7 is an explanatory diagram for schematically comparing and explaining the size of pixels in a display panel and the size of the second translucent electrode. The display panel 2 displays an image. As illustrated in FIG. 7, in the display panel 2, a large number of pixels Pix are arranged two-dimensionally. Light emitted from the backlight 3 (see FIG. 4) enters the display panel 2. The display panel 2 displays an image by changing the transmissivity of light entering the pixels Pix.

The display device 100 of the first embodiment is applicable to both a display device for monochrome display and a display device for color display. When the display device 100 for color display is used, one pixel Pix (unit pixel), which is a unit for forming a color image, includes a plurality of sub-pixels (subpixels). More specifically, in the display device for color display, for example, one pixel includes three sub-pixels of a sub-pixel that displays red (R), a sub-pixel that displays green (G), and a sub-pixel that displays blue (B).

One pixel is not limited to a combination of sub-pixels of three primary colors of RGB, and one pixel may also be formed by adding one or more colors of sub-pixels to the sub-pixels of three primary colors of RGB. More specifically, for example, one pixel may be formed by adding a sub-pixel that displays white (W) to improve luminance, and one pixel may be formed by adding at least one sub-pixel that displays a complementary color to expand the color reproduction range.

A plurality of pixel electrodes 25 arranged in a matrix (row-column configuration) and a common electrode 24 are provided on the liquid crystal layer 29 side of the substrate 21 illustrated in FIG. 5 and FIG. 6. The pixel electrodes 25 and the common electrode 24 are insulated by an insulation layer 26, and face each other in the Z direction perpendicular to the surface of the substrate 21. The pixel electrodes 25 and the common electrode 24 are translucent electrodes formed of a translucent conductive material (translucent conductive oxide) such as indium tin oxide (ITO). The substrate 21 is a translucent substrate such as glass and resin. A layered orientation film 83 is provided on the liquid crystal layer 29 side of the substrate 21. The third polarizing member 32 is arranged on the substrate 21 at the opposite side from the liquid crystal layer 29.

A color filter (not illustrated) and an orientation film 84 are provided on the liquid crystal layer 29 side of the substrate 22 illustrated in FIG. 5 and FIG. 6. For example, the color filter includes color regions colored in three colors of red (R), green (G), and blue (B). The second polarizing member 31 is arranged on the substrate 22 at the opposite side from the liquid crystal layer 29.

The display panel 2 includes a drive circuit 27 referred to as a driver IC. A flexible printed circuit board (FPC) 28 transmits signals to the drive circuit 27 or drive power for driving the drive circuit 27.

As illustrated in FIG. 5 and FIG. 6, the front surface panel 1 includes a first substrate 11, a second substrate 12, and a liquid crystal layer 19 sealed between the first substrate 11 and the second substrate 12 with a sealing layer 13. The first substrate 11 and the second substrate 12 are translucent substrates such as glass and resin.

The liquid crystal layer 19 modulates the polarization direction of incident light that passes through the liquid crystal layer 19, such that the polarization direction can be converted, depending on the state of the electric field. For example, in the first embodiment, the TN mode is used in the liquid crystal layer 19.

The first translucent electrode 14 having a size equal to or more than the entire region of the pixels Pix formed in a matrix (row-column configuration) illustrated in FIG. 7, is provided on the liquid crystal layer 19 side of the first substrate 11 illustrated in FIG. 5 and FIG. 6. The second translucent electrode 15 having a size equal to or more than the entire region of the pixels Pix formed in a matrix (row-column configuration) illustrated in FIG. 7, is provided on the liquid crystal layer 19 side of the second substrate 12. In the present embodiment, the first translucent electrode 14 is a drive electrode the voltage supplied thereto is changed, and that changes the state of the liquid crystal layer 19 by the electric field. The second translucent electrode 15 is a fixed potential electrode that maintains a fixed potential at a fixed voltage. As illustrated in FIG. 5 and FIG. 6, the first translucent electrode 14 is covered by a translucent insulating film 85 such as silicon nitride. An insulating film 86 can prevent short-circuiting between the second translucent electrode 15 and the first translucent electrode 14. The insulating film 85 prevents corrosion of a metal layer 73, by covering the metal layer 73.

Liquid crystals in the liquid crystal layer 19 that come into contact with an orientation film 81, which is interposed between the first substrate 11 and the liquid crystal layer 19, are oriented in a single direction. Similarly, liquid crystals in the liquid crystal layer 19 that come into contact with an orientation film 82, which is interposed between the second substrate 12 and the liquid crystal layer 19, are oriented in a direction different from the orientation of liquid crystals that come into contact with the first substrate 11. The first translucent electrode 14 and the second translucent electrode 15 face each other in the Z direction that is perpendicular to the surface of the first substrate 11. The first translucent electrode 14 and the second translucent electrode 15 are translucent electrodes formed of a translucent conductive material (translucent conductive oxide) such as ITO.

As illustrated in FIG. 7, the area of the active region 10 is the same as that of a display region where all the pixels Pix are arranged.

The FPC 18 is electrically coupled to the front surface panel 1 with a bonding pad 74. A part of the metal layer 73 illustrated in FIG. 5 is patterned as illustrated in FIG. 4, and serves as wiring for coupling each conductive column 71 electrically coupled to the second translucent electrodes 1511 to 1526, and 1531 to 1536 illustrated in FIG. 3, with the bonding pad 74. A part of the metal layer 73 may also serve as wiring for coupling each second translucent electrode 15 with the bonding pad 74. The other part of the metal layer 73 is arranged along the frame region 10F. The other part of the metal layer 73 serves as wiring, and also serves as a light-shielding part that shields the frame region 10F from light so that the light transmissivity of the frame region 10F becomes lower than the light transmissivity of the active region 10. The drive circuit 17 transmits the electrical power of the first translucent electrode 14 and the second translucent electrode 15 to the front surface panel 1 via the FPC 18.

The material of the first polarizing member 4 is selected according to the desired polarization and irregularities in the reflected image. For example, a base material layer 64 made of a cycloolefin polymer is provided on the second substrate 12 at the opposite side from the liquid crystal layer 19. On the display surface side of the base material layer 64, a rubbing treatment is performed and a specific orientation is given.

The first polarizing member 4 is formed on the display surface side of the base material layer 64. In other words, the first polarizing member 4 is provided on the surface opposite from the liquid crystal layer 19 of the second substrate 12. The first polarizing member 4 is a coating type polarizing layer, which is a mixture of a liquid crystal material and dichroic dye. When the first polarizing member 4 is the coating type polarizing layer, which is the mixture of a liquid crystal material and dichroic dye, in the display device 100, the wavelength at the short wavelength side of the reflected image is hardly absorbed, and the whiteness becomes close to neutral.

The first polarizing member 4 may also be a polarizing plate that allows iodine to be absorbed in a polyvinyl alcohol (PVA) film, and aligns the orientation of molecules in a predetermined direction, by extending in one direction. In this case, the base material layer 64 is omitted, and the first polarizing member 4 is provided on the second substrate 12 at the opposite side from the liquid crystal layer 19.

The optical sheet 5 transmits the linearly polarized light in the first polarization direction, and reflects the linearly polarized light in the second polarization direction. The optical sheet 5 may also be referred to as a reflective type polarizing plate.

Figure 8:
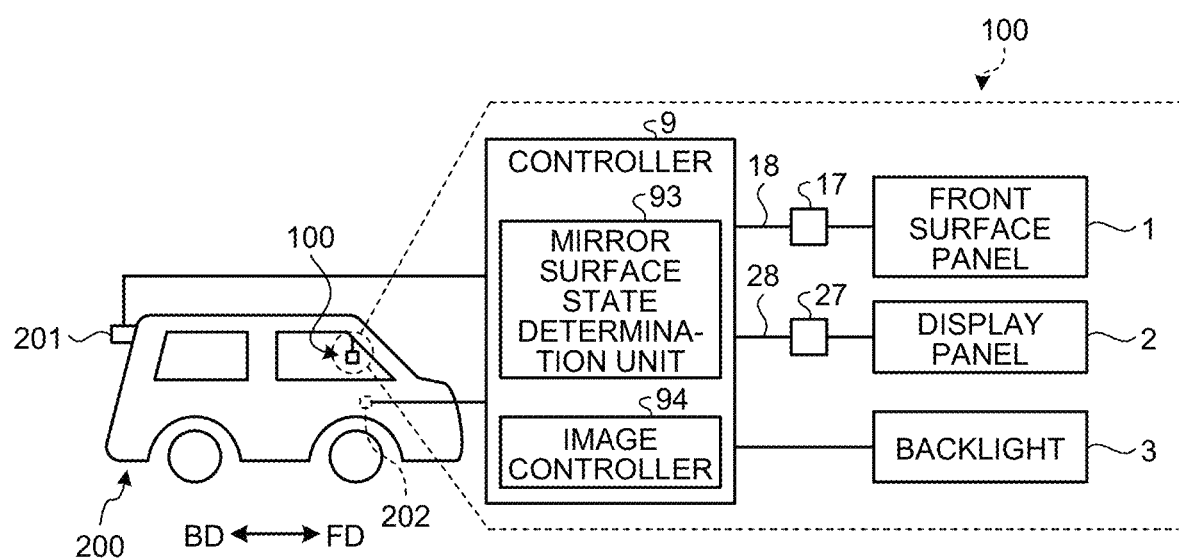
FIG. 8 is a block diagram for explaining the display device of the first embodiment.

FIG. 8 is a block diagram for explaining the display device of the first embodiment. In FIG. 8, the display device 100 of the first embodiment is used as a room mirror of a vehicle. For example, a controller 9 is a computer including a central processing unit (CPU), which is an arithmetic unit, and a memory, which is a storage device. The controller 9 may also implement various functions by executing computer programs using these hardware resources.

More specifically, the controller 9 reads out a computer program stored in a predetermined storage unit (not illustrated), develops the computer program in the memory, and causes the CPU to execute an instruction included in the computer program developed in the memory. In the first embodiment, the controller 9 includes a mirror surface state determination unit 93 and an image controller 94. The mirror surface state determination unit 93 and the image controller 94 are functions of the controller 9 implemented by executing the computer program using the hardware resources.

The image controller 94 controls the turning ON and OFF of the backlight 3, and the amount of light and the intensity of light when the light is turned ON, according to the execution result of the instruction by the CPU. The image controller 94 also transmits an image signal to be displayed on the display panel 2 to the drive circuit 27 via the flexible printed circuit board 28, according to the execution result of the instruction by the CPU. The drive circuit 27 then displays an image on the display panel 2. The mirror surface state determination unit 93 controls the drive circuit 17 via the FPC 18, according to an instruction signal of a display state from an input unit 202, and causes the drive circuit 17 to apply a voltage to the first translucent electrode 14. Consequently, the voltage of the first translucent electrode 14 will be equal to or more than a threshold. The mirror surface state determination unit 93 may also control the drive circuit 17 via the FPC 18, according to an instruction signal of a reflective state from the input unit 202, and cause the drive circuit 17 not to apply a voltage to the first translucent electrode 14. Consequently, the applied voltage of the first translucent electrode 14 becomes a reference voltage, and becomes smaller than a threshold.

For example, as illustrated in FIG. 8, the controller 9 is coupled to an image pickup device 201 of a vehicle 200. The image pickup device 201 picks up an image of a rear BD of the vehicle 200, and the image of the rear BD of the vehicle 200 is transmitted to the controller 9. In a display state, the display device 100 displays the image of the rear BD of the vehicle 200. The position where the image pickup device 201 is attached to the vehicle may also be a position where the image pickup device 201 can pick up an image of a front FD of the vehicle 200, or a position where the image pickup device 201 can pick up an image of the surroundings of the vehicle 200.

Figure 9:
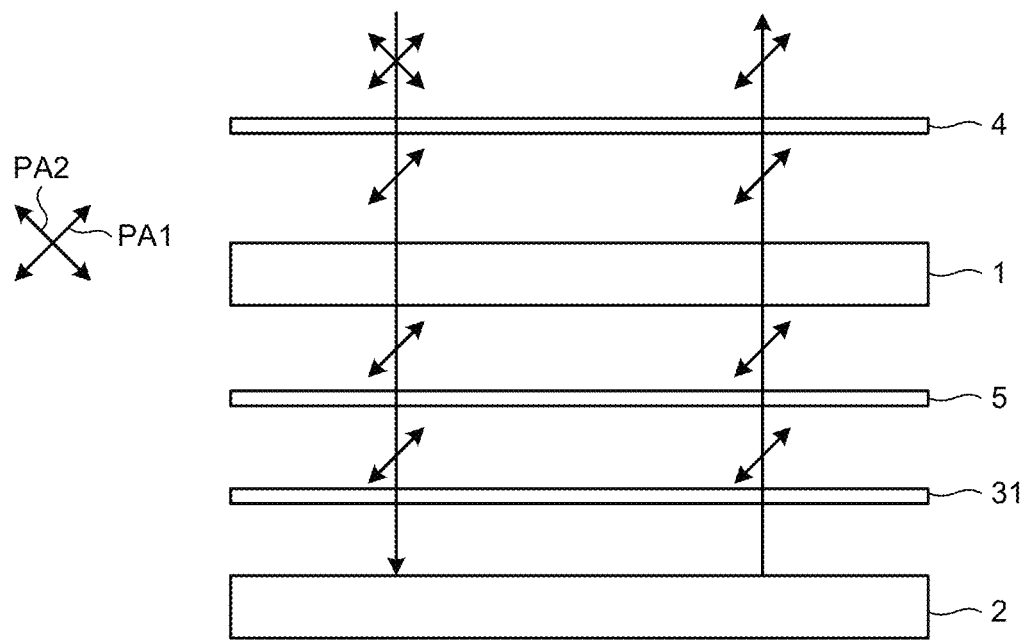
FIG. 9 is a schematic diagram for explaining a display state capable of displaying an image in a transmissive state in which incident light is transmitted.

FIG. 9 is a schematic diagram for explaining a display state capable of displaying an image in a transmissive state in which incident light is transmitted. As illustrated in FIG. 9, the first polarizing member 4 absorbs the linearly polarized light in a second polarization direction PA2 orthogonal to a first polarization direction PA1.

The linearly polarized light in the first polarization direction PA1 transmits through the first polarizing member 4, and enters the front surface panel 1. As illustrated in FIG. 6, in the front surface panel 1, the drive circuit 17 is provided so as to apply a voltage to the first translucent electrode 14. A vertical electric field is applied between the first translucent electrode 14 and the second translucent electrode 15. Consequently, in the front surface panel 1, the linearly polarized light in the first polarization direction PA1 entered from the first polarizing member 4 is emitted to the optical sheet 5, as the linearly polarized light in the first polarization direction PA1.

In this process, when the display panel 2 displays an image, the first polarizing member 4, the front surface panel 1, and the optical sheet 5 are in states such that the shutters are opened with respect to the linearly polarized light in the first polarization direction PA1. Consequently, the image can be easily viewed.

The optical sheet 5 transmits the linearly polarized light in the first polarization direction PA1 entered from the front surface panel 1. The second polarizing member 31 transmits the linearly polarized light in the first polarization direction PA1. In this manner, the image of the display panel 2 can be viewed from the display surface side of the first polarizing member 4.

By using the linearly polarized light in the first polarization direction PA1, the display panel 2 outputs an image via the second polarizing member 31.

The optical sheet 5 transmits the linearly polarized light in the first polarization direction PA1 entered from the display panel 2.

The front surface panel 1 emits the linearly polarized light in the first polarization direction PA1 entered from the optical sheet 5 to the first polarizing member 4, as the linearly polarized light in the first polarization direction PA1.

The linearly polarized light in the first polarization direction PA1 transmits through the first polarizing member 4, and is output as an image on the display surface side of the first polarizing member 4.

As described above, when the mirror surface state determination unit 93 illustrated in FIG. 8 receives an instruction signal of a transmissive state from the input unit 202, the drive circuit 17 is operated so that the display device 100 is in a transmissive state in which the incident light is transmitted. The image controller 94 controls the backlight 3 and the display panel 2, and displays an image on the display panel 2.

Figure 10:
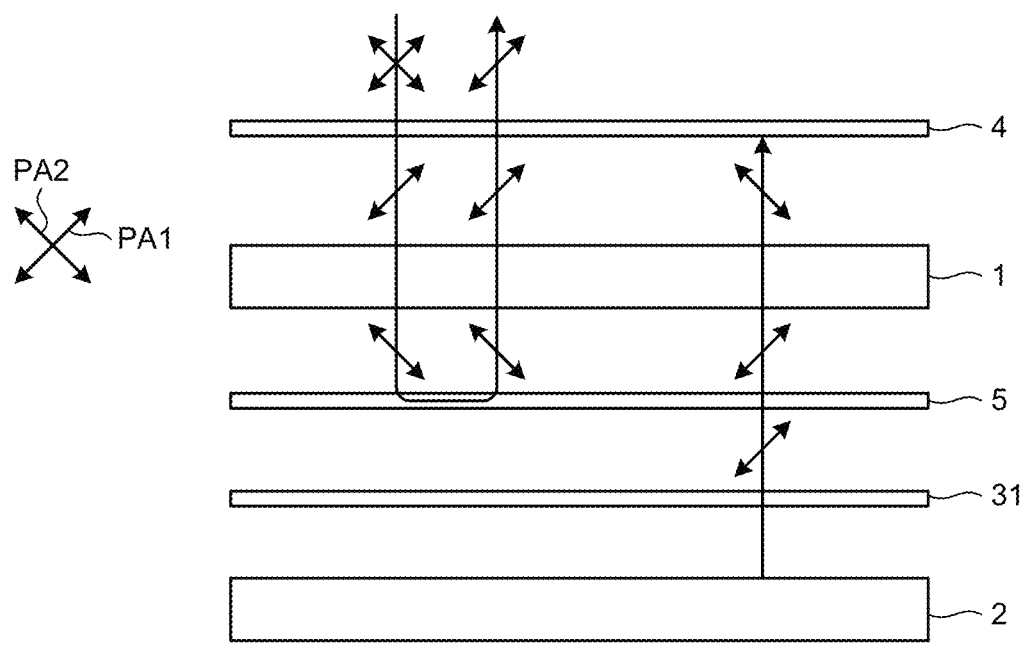
FIG. 10 is a schematic diagram for explaining a reflective state in which incident light is reflected.

FIG. 10 is a schematic diagram for explaining a reflective state in which incident light is reflected. As illustrated in FIG. 10, the first polarizing member 4 absorbs the linearly polarized light in the second polarization direction PA2 orthogonal to the first polarization direction PA1.

The linearly polarized light in the first polarization direction PA1 transmits through the first polarizing member 4, and enters the front surface panel 1. As illustrated in FIG. 5, in the front surface panel 1, the drive circuit 17 is provided so as not to apply a voltage to the first translucent electrode 14. Consequently, in the front surface panel 1, the linearly polarized light in the first polarization direction PA1 entered from the first polarizing member 4 is converted into the linearly polarized light in the second polarization direction PA2, and is emitted to the optical sheet 5.

The optical sheet 5 reflects the linearly polarized light in the second polarization direction PA2 entered from the front surface panel 1.

The linearly polarized light in the second polarization direction PA2 reflected by the optical sheet 5 enters the front surface panel 1. The front surface panel 1 converts the linearly polarized light in the second polarization direction PA2 entered from the optical sheet 5 into the linearly polarized light in the first polarization direction PA1, and emits the converted light to the first polarizing member 4.

The linearly polarized light in the first polarization direction PA1 from the front surface panel 1 transmits through the first polarizing member 4. When viewed from the display surface side of the first polarizing member 4, an image on the display surface side of the first polarizing member 4 is displayed as a mirror surface.

In this process, even if the display panel 2 displays an image, the first polarizing member 4, the front surface panel 1, and the optical sheet 5 are in states such that the shutters are closed with respect to the linearly polarized light in the second polarization direction PA2 that is converted from the linearly polarized light in the first polarization direction PA1 emitted from the display panel 2. Consequently, the image is difficult to see.

More specifically, by using the linearly polarized light in the first polarization direction PA1, the display panel 2 outputs an image via the second polarizing member 31.

The optical sheet 5 transmits the linearly polarized light in the first polarization direction PA1 entered from the display panel 2.

The front surface panel 1 converts the linearly polarized light in the first polarization direction PA1 entered from the optical sheet 5 into the linearly polarized light in the second polarization direction PA2, and emits the converted light to the first polarizing member 4.

The linearly polarized light in the second polarization direction PA2 is absorbed by the first polarizing member 4, and the image is difficult to see from the display surface side of the first polarizing member 4.

As described above, when the mirror surface state determination unit 93 illustrated in FIG. 8 receives an instruction signal of a reflective state from the input unit 202, the drive circuit 17 is operated so that the display device 100 is in a reflective state in which the incident light is reflected. In the reflective state, the image is difficult to see even if the image is displayed on the display panel 2. Thus, when the mirror surface state determination unit 93 illustrated in FIG. 8 receives an instruction signal of a reflective state from the input unit 202, the image controller 94 prevents the image from being displayed on the display panel 2.

As described above, the display device 100 includes the first polarizing member 4, the optical sheet 5, the front surface panel 1, the second polarizing member 31, and the display panel 2. The first polarizing member 4 absorbs the linearly polarized light in the second polarization direction PA2 orthogonal to the first polarization direction PA1. The optical sheet 5 reflects the linearly polarized light in the second polarization direction PA2, and transmits the linearly polarized light in the first polarization direction PA1. The front surface panel 1 can covert the polarization direction of the incident light to the other polarization direction, according to the applied voltage. The front surface panel 1 is arranged between the first polarizing member 4 and the optical sheet 5. The display panel 2 is overlapped with the front surface panel 1 in the Z direction, with respect to the optical sheet 5, via the second polarizing member 31 that transmits the linearly polarized light in the second polarization direction PA2. Consequently, the display device 100 can switch between the display state in which an image is displayed as illustrated in FIG. 6 and FIG. 9, and the mirror state (reflective state) in which a reflected image can be obtained as illustrated in FIG. 5 and FIG. 10.

The front surface panel 1 is at the observer's side than the display panel 2. The front surface panel 1 is a panel that can switch between a first front surface panel state in which the entered linearly polarized light in the first polarization direction PA1 is emitted as the linearly polarized light in the first polarization direction PA1, and a second front surface panel state in which the entered linearly polarized light in the first polarization direction PA1 is converted into and emitted as the linearly polarized light in the second polarization direction PA2, depending on the state of the drive circuit 17 applying a voltage to the first translucent electrode 14.

Consequently, in the first front surface panel state, the display device 100 is switched to a reflective state, and in the second front surface panel state, the display device 100 is switched to a display state. The power consumption in the reflective state becomes smaller than the power consumption in the display state. In other words, when the applied voltage is smaller than a threshold, in the display device 100, the incident light is reflected. As a result, in the display device 100, it is possible to reduce the power consumption in the reflective state.

Figure 11:
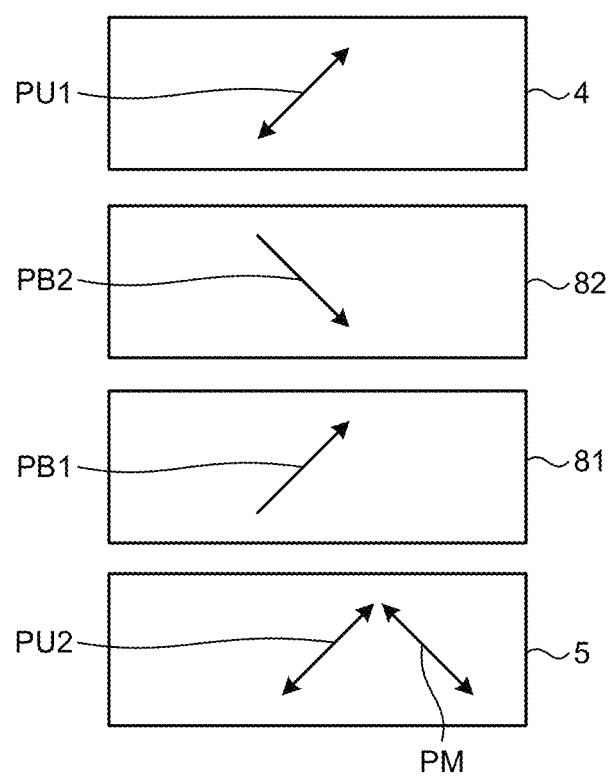
FIG. 11 is an explanatory diagram for schematically explaining a relation between a transmissive axis of a first polarizing member and a transmissive axis of an optical sheet.

FIG. 11 is an explanatory diagram for schematically explaining a relation between a transmissive axis of a first polarizing member and a transmissive axis of an optical sheet. FIG. 11 illustrates a transmissive axis direction PU1 of the first polarizing member 4, a rubbing direction PB2 of the orientation film 82, a rubbing direction PB1 of the orientation film 81, a transmissive axis direction PU2 of the optical sheet 5, and a reflective axis direction PM of the optical sheet 5.

As illustrated in FIG. 11, the rubbing direction PB2 of the orientation film 82 and the rubbing direction PB1 of the orientation film 81 are directions intersecting with each other in a plan view. The transmissive axis direction PU1 of the first polarizing member 4 and the transmissive axis direction PU2 of the optical sheet 5 are parallel to each other. The transmissive axis direction PU1 of the first polarizing member 4 and the reflective axis direction PM of the optical sheet 5 are directions intersecting with each other. Consequently, the first polarizing member 4 and the optical sheet 5 transmit the linearly polarized light in the first polarization direction PA1.

Figure 12:
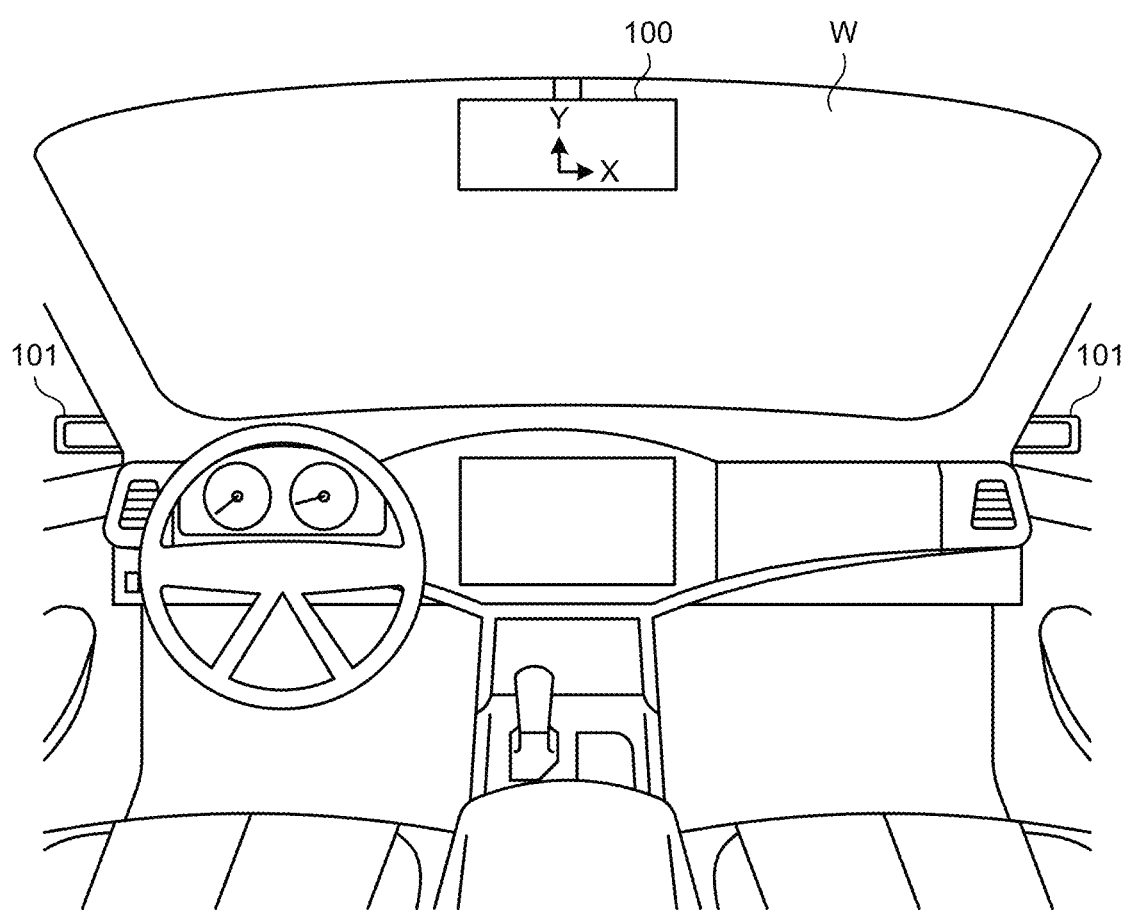
FIG. 12 is a diagram illustrating an attached state of a mirror device.

FIG. 12 is a diagram illustrating an attached state of a mirror device. In FIG. 12, the display device 100 of the first embodiment is used as a room mirror arranged on the upper center portion of a window W. The mirror device is capable of displaying an image both in a reflective state in which the incident light is reflected, and in a transmissive state in which the incident light is transmitted.

When the applied voltage of the first translucent electrode 14 is smaller than a threshold, the display device 100 is switched to a reflective state in which the incident light is reflected. Thus, the display device 100 functions as a mirror the mirror surface of which reflects the incident light from the rear of the vehicle, and that can view the rear of the vehicle. In the reflective state, the controller 9 illustrated in FIG. 8 does not display an image of the rear BD of the vehicle 200 on the display panel 2.

In the display state, the display panel 2 of the display device 100 displays an image of the rear picked up by the image pickup device 201 (see FIG. 8). In the display state, the display panel 2 of the display device 100 may also display an image of the surroundings of the vehicle picked up by the image pick device.

The display device 100 of the first embodiment may also be applied to a side mirror 101 of the vehicle. The side mirror 101 of the vehicle is arranged outside of the vehicle, but may also be arranged inside of the vehicle.

Figure 13:
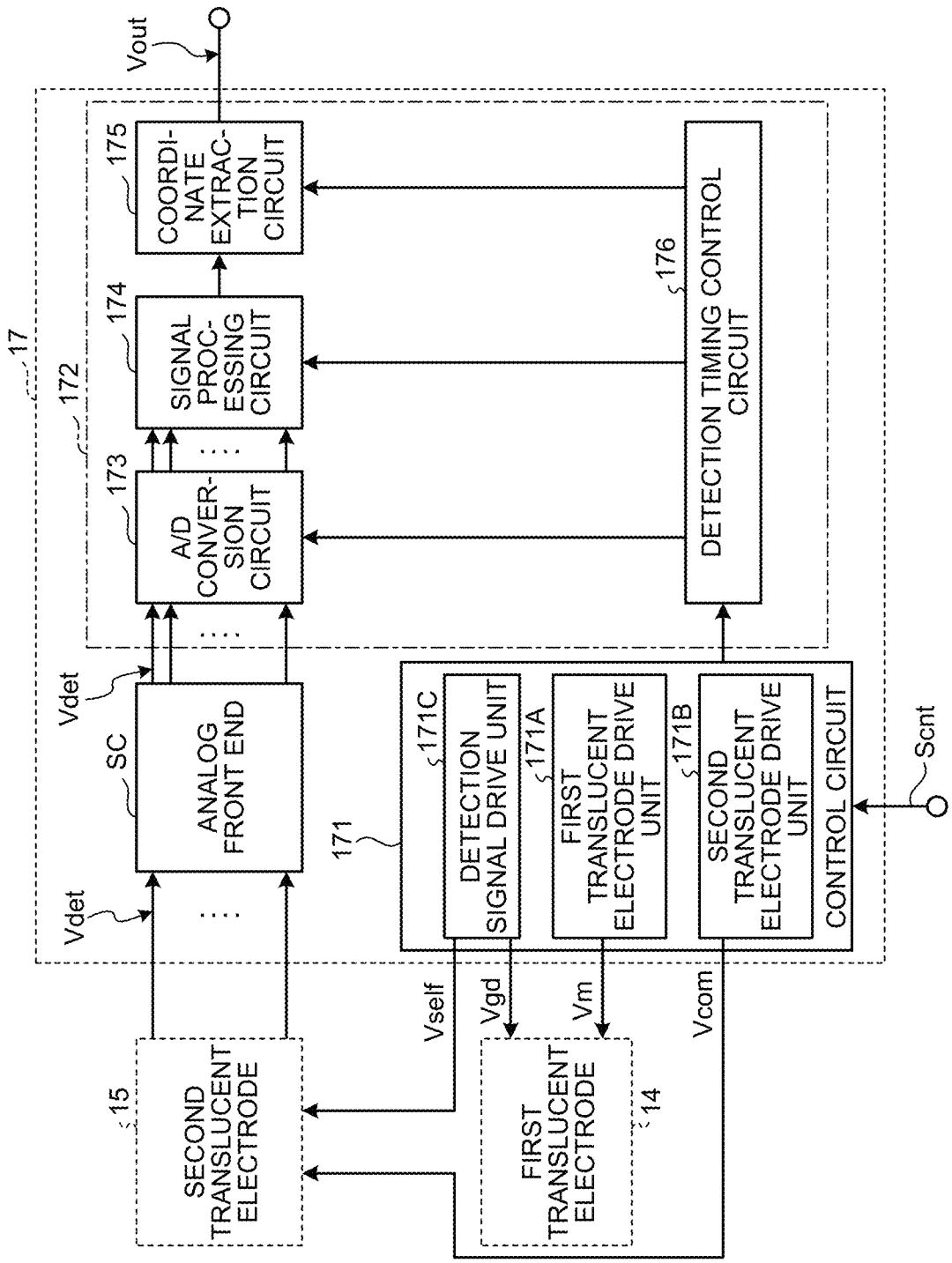
FIG. 13 is an example of a block diagram of a drive circuit.

FIG. 13 is an example of a block diagram of a drive circuit. The drive circuit 17 includes a control circuit 171, a detection circuit 172, and an analog front end SC. The control circuit 171 includes a first translucent electrode drive unit 171A, a second translucent electrode drive unit 171B, and a detection signal drive unit 171C.

The second translucent electrode drive unit 171B is a circuit that supplies a drive signal Vcom to the second translucent electrodes 1511 to 1526, and 1531 to 1536, according to an instruction signal Scnt from the controller 9.

The first translucent electrode drive unit 171A supplies a drive signal Vm to the first translucent electrodes 1411 to 1426, and 1431 to 1436, according to the instruction signal Scnt from the controller 9.

The detection signal drive unit 171C is a circuit that supplies a drive signal Vself to the second translucent electrodes 1511 to 1526, and 1531 to 1536, according to the instruction signal Scnt from the controller 9. The detection signal drive unit 171C supplies a guard signal Vgd that is the same signal as the drive signal Vself, to the first translucent electrodes 1411 to 1426, and 1431 to 1436.

The control circuit 171 supplies the drive signal Vself to the second translucent electrodes 1511 to 1526, and 1531 to 1536, via the wiring of the metal layer 73 described above.

The second translucent electrodes 1511 to 1526, and 1531 to 1536 output detection signals Vdet corresponding to the position of an object to be detected that is in contact with or near the front surface panel 1, on the basis of a detection method of an object to be detected using a self-capacitance method, which will be described below. The second translucent electrodes 1511 to 1526, and 1531 to 1536 are electrically coupled to the analog front end SC, via the metal layer 73 described above. The second translucent electrodes 1511 to 1526, and 1531 to 1536 output the detection signals Vdet to the analog front end SC, corresponding to whether the object to be detected is in contact with or near the front surface panel 1.

As illustrated in FIG. 13, the detection circuit 172 includes an A/D conversion circuit 173, a signal processing circuit 174, a coordinate extraction circuit 175, and a detection timing control circuit 176. The detection timing control circuit 176 controls the A/D conversion circuit 173, the signal processing circuit 174, and the coordinate extraction circuit 175 such that the A/D conversion circuit 173, the signal processing circuit 174, and the coordinate extraction circuit 175 are operated synchronously, on the basis of the control signal supplied from the control circuit 171.

The detection signals Vdet from the second translucent electrodes 1511 to 1526, and 1531 to 1536 are supplied to the detection circuit 172, via the analog front end SC. The analog front end SC suppresses the noise of the supplied detection signals Vdet, and adjusts the signals by amplifying a signal component and the like. The A/D conversion circuit 173 samples each analog signal output from the analog front end SC and converts the sampled analog signal into a digital signal, at a timing synchronized with the drive signal Vself.

The signal processing circuit 174 performs a process of extracting a differential signal (absolute value |ΔV|) of a detection signal, on the basis of an output signal of the A/D conversion circuit 173. The signal processing circuit 174 compares between the absolute value |ΔV| and a predetermined threshold voltage, and when the absolute value |ΔV| is less than the threshold voltage, determines that the object to be detected is in an absence state. On the other hand, when the absolute value |ΔV| is equal to or more than the threshold voltage, the signal processing circuit 174 determines that the object to be detected is in a presence state.

The coordinate extraction circuit 175 is a logic circuit for calculating the coordinates of the object to be detected, when the object to be detected is detected by the signal processing circuit 174. The coordinate extraction circuit 175 outputs the coordinates of the object to be detected as an output signal Vout.

As described above, on the basis of the detection signals Vdet output from the second translucent electrodes 1511 to 1526, and 1531 to 1536, and by using the active region 10 of the front surface panel 1 as a detection surface, the detection circuit 172 detects the object to be detected that has come close to the detection surface. The detection circuit 172 calculates the coordinates of the object to be detected and the like, on the basis of the position of one of the second translucent electrodes 1511 to 1526, and 1531 to 1536 determined that the object to be detected is in a presence state.

Figure 14:
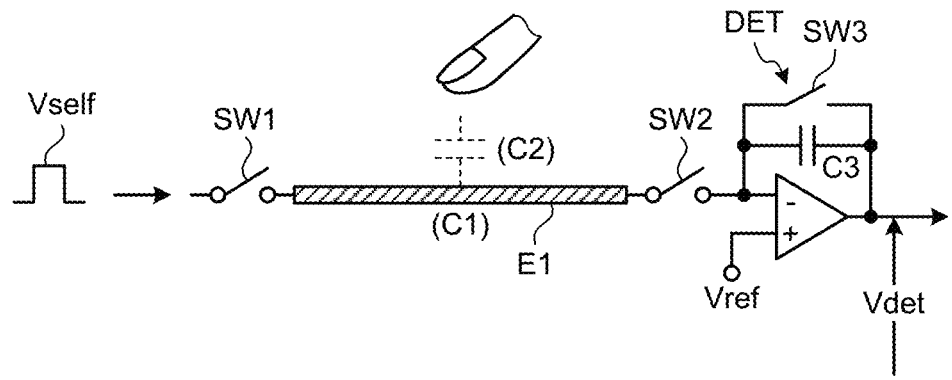
FIG. 14 is an explanatory diagram illustrating an example of an equivalent circuit for self-capacitance detection.
Figure 15:
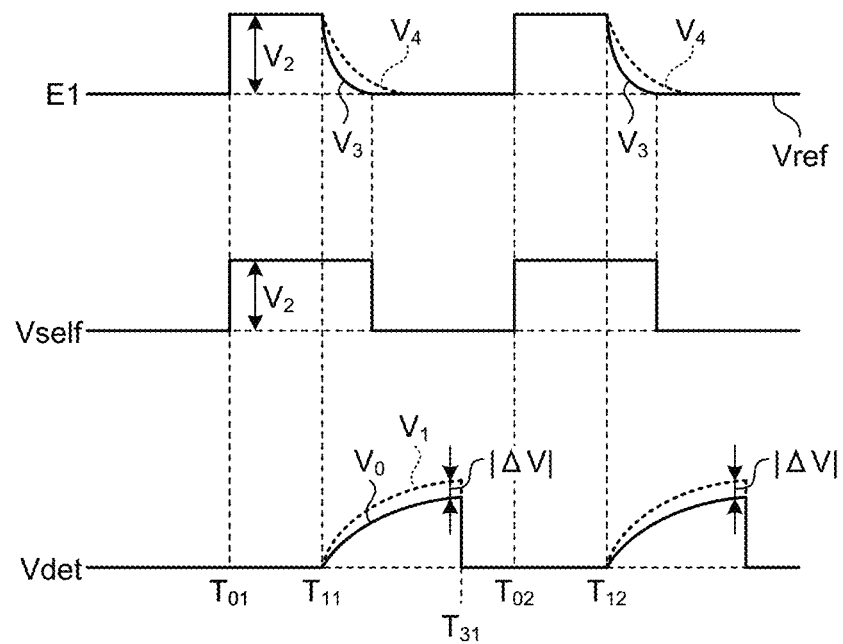
FIG. 15 is a diagram illustrating an example of waveforms of a drive signal for self-capacitance detection and a detection signal.

FIG. 14 is an explanatory diagram illustrating an example of an equivalent circuit for self-capacitance detection. FIG. 15 is a diagram illustrating an example of waveforms of a drive signal for self-capacitance detection and a detection signal. A detection circuit is also illustrated in FIG. 14. In the following explanation, the object to be detected is a finger. However, for example, the object to be detected is not limited to a finger, and may also be a hand or an object including a conductor such as a stylus pen. Hereinafter, the explanation is made by referring one of the second translucent electrodes 1511 to 1526, and 1531 to 1536 as a detection electrode E1.

In the absence state, the drive signal Vself, which is an alternating current (AC) rectangular wave, of a predetermined frequency (for example, about a few kHz to a few hundred kHz) is applied to the detection electrode E1. The detection electrode E1 has capacitance C1, and a current corresponding to the capacitance C1 flows. A voltage detector DET converts the current fluctuation corresponding to the drive signal Vself into a voltage fluctuation (a waveform $V_0$ in a solid line (see FIG. 15)).

Next, as illustrated in FIG. 14, in the presence state of the object to be detected, capacitance C2 between the finger and the detection electrode E1 is added to the capacitance C1 of the detection electrode E1. Thus, when the drive signal Vself is applied to the detection electrode E1, a current corresponding to the capacitance C1 and the capacitance C2 flows. As illustrated in FIG. 4, the voltage detector DET converts the current fluctuation corresponding to the drive signal Vself into a voltage fluctuation (waveform $V_1$ in a dotted line). The presence of the object to be detected is then measured, on the basis of the absolute value |ΔV| of a difference between the waveform $V_0$ and the waveform $V_1$.

More specifically, in FIG. 15, the drive signal Vself is increased to a voltage level corresponding to the voltage $V_2$, at time $T_{01}$. In this process, a switch SW1 is turned ON, and a switch SW2 is turned OFF. Thus, the potential of the detection electrode E1 is also increased to the voltage $V_2$. Next, the switch SW1 is turned OFF before time $T_{11}$. In this case, the detection electrode E1 is in a floating state, but the potential of the detection electrode E1 is maintained at $V_2$, by the capacitance C1 (or C1+C2, see FIG. 3) of the detection electrode E1. A reset operation of the voltage detector DET is also performed before time $T_{11}$.

Next, when the switch SW2 is turned ON at time $T_{11}$, electric charge accumulated in the capacitance C1 (or C1+C2) of the detection electrode E1 moves to the capacitance C3 in the voltage detector DET. Consequently, the output of the voltage detector DET is increased (see the detection signal Vdet in FIG. 4). In the absence state, the output of the voltage detector DET (detection signal Vdet) is as illustrated by the waveform $V_0$ in a solid line, and it will be Vdet=C1×$V_2$/C3. In the presence state, the output of the voltage detector DET is as illustrated by the waveform $V_1$ in a dotted line, and it will be Vdet=(C1+C2)×$V_2$/C3.

Then, by turning OFF the switch SW2, and turning ON the switch SW1 and a switch SW3 at time $T_{31}$, the potential of the detection electrode E1 is lowered to the same level as that of the drive signal Vself, and the voltage detector DET is reset. The above described operation is repeated at a predetermined frequency (for example, about a few kHz to a few hundred kHz). In this manner, the detection circuit 172 can detect the presence state of the object to be detected, on the basis of the detection method of the object to be detected using the self-capacitance method.

Figure 16:
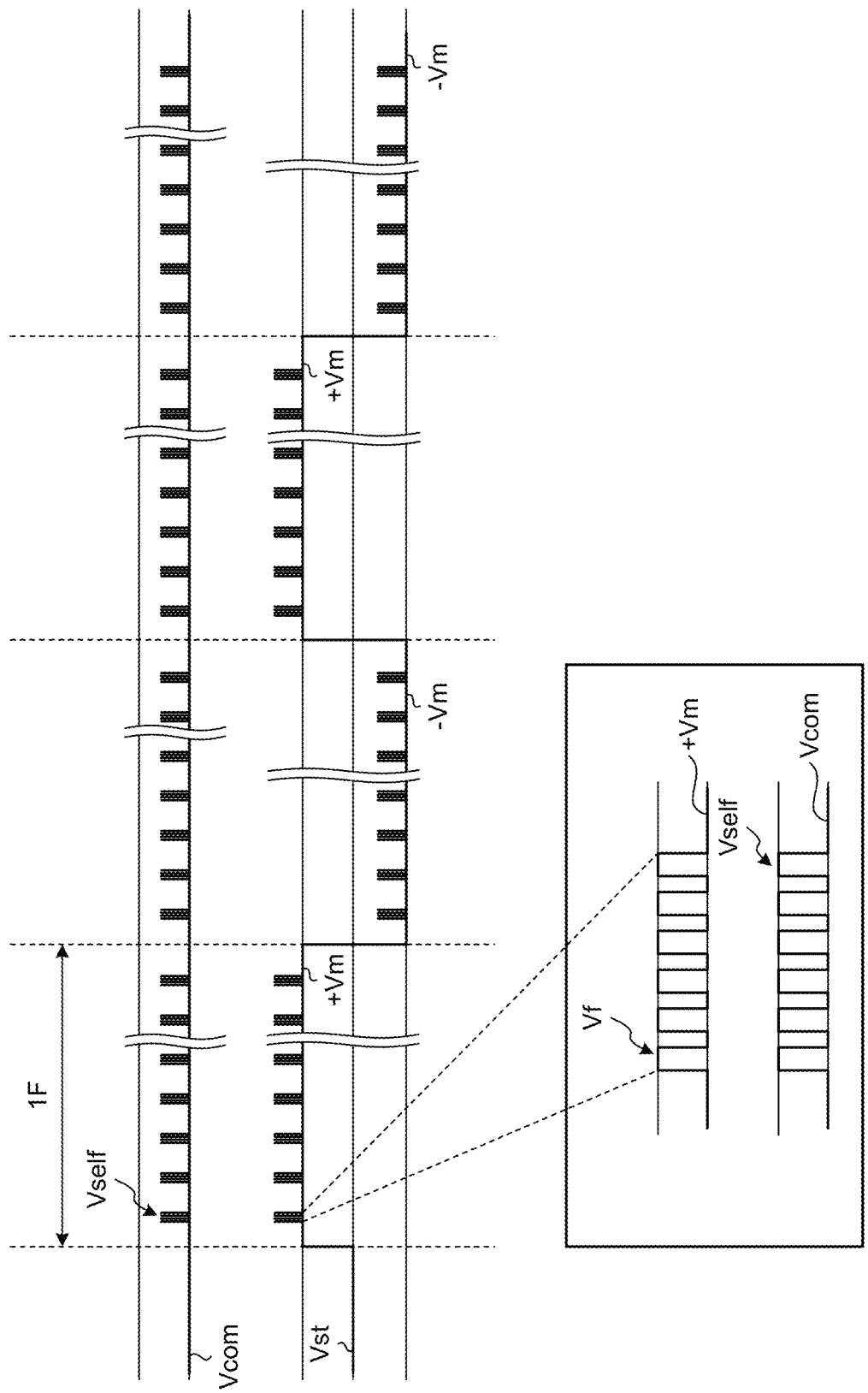
FIG. 16 is a timing chart of capacitance detection in the display state of the first embodiment.

FIG. 16 is a timing chart of capacitance detection in the display state. In the reflective state of the first embodiment, the drive signal Vcom is supplied to the second translucent electrode 15 from the second translucent electrode drive unit 171B. The drive signal Vm is not supplied to the first translucent electrode 14 from the first translucent electrode drive unit 171A, and the first translucent electrode 14 has a reference voltage Vst. When the first translucent electrode 14 has the reference voltage Vst, the front surface panel 1 is in a reflective state.

The drive signal Vcom is supplied to the second translucent electrode 15 from the second translucent electrode drive unit 171B. The drive signal Vm is supplied to the first translucent electrode 14 from the first translucent electrode drive unit 171A, and the polarity of which is inverted for each frame 1F. Consequently, the applied voltage of the first translucent electrode 14 becomes equal to or more than a threshold with respect to the drive signal Vcom of the second translucent electrode 15, and the active region 10 is switched to a transmissive state.

The detection signal drive unit 171C supplies the drive signal Vself to the second translucent electrodes 1511 to 1526, and 1531 to 1536 for a plurality of times. As described above, a single drive signal Vself is an AC rectangular wave. Because the potential of the first translucent electrode 14 is capacitively coupled to the second translucent electrode 15, a signal Vf synchronized with the drive signal Vself appears.

As described above, in the reflective state and the transmissive state, the same first voltage is applied to the second translucent electrode 15 by the drive signal Vcom. In the transmissive state, the drive signal Vself, which is an AC rectangular wave, is superimposed on the first voltage of the drive signal Vcom.

In the first embodiment, a display mode in which an image is displayed on the active region 10, and a reflective mode in which the active region 10 becomes a mirror surface state are performed in a time-division manner. When the active region 10 is in the reflective mode, the reflectivity may be lowered, because a finger or a hand of the object to be detected may come into contact with the active region 10, and the active region 10 may be stained by fingerprints and the like. Thus, it has been desired to detect the position and movement of the object to be detected, even if a finger or a hand of the object to be detected is not in contact with the active region 10, such as in a state in which the object to be detected is not in contact with the detection surface or display surface, or in a state in which the object to be detected is not near the detection surface or display surface enough to be considered the same as being in contact therewith (hereinafter, referred to as a "non-contact state"). In the present disclosure, hover detection is to detect the position of the object to be detected, in a non-contact state.

Figure 17:
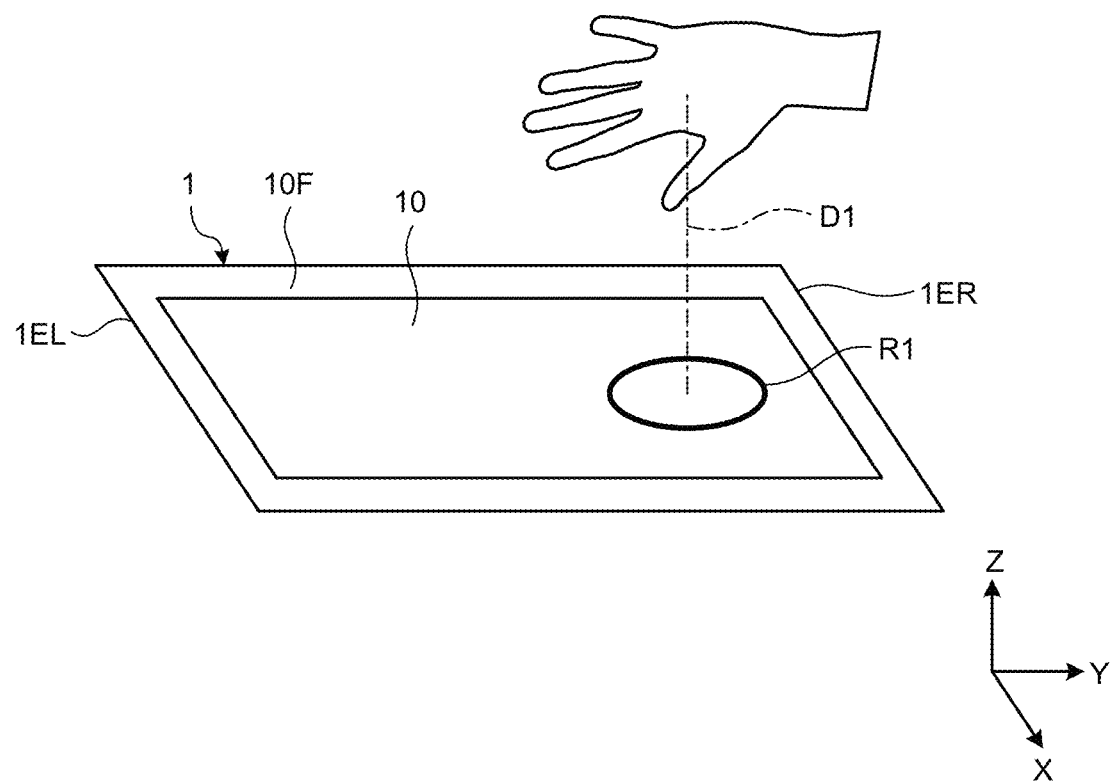
FIG. 17 is an explanatory diagram illustrating an example of hover detection according to the first embodiment.

FIG. 17 is an explanatory diagram illustrating an example of hover detection according to the first embodiment. As illustrated in FIG. 9, the front surface panel 1 performs hover detection while a finger or a hand of an operator, which is an object to be detected, is in a non-contact state with respect to the active region 10. The detection circuit 172 can detect a change in capacitance caused by the object to be detected, in a direction perpendicular to the active region 10, on the basis of the detection signal Vdet, even there is a distance D1 from the object to be detected. The detection circuit 172 can also detect a position R1 of the object to be detected, on the basis of the detection signal Vdet. For example, the position R1 of the object to be detected is the position that faces the object to be detected in the direction perpendicular to the active region 10, and is the position corresponding to an electrode, the voltage fluctuation of the detection signal Vdet of which becomes the maximum value, among the second translucent electrodes 1511 to 1520.

Consequently, the display device 100 of the first embodiment can prevent the active region 10 from being stained, and detect the object to be detected.

In the hover detection, a finger or a hand of an operator is moved in the air without physically coming into contact with the active region 10. Thus, the operator may feel difficult to operate. In the hover detection, to improve the accuracy of the position R1 of the object to be detected, the areas of the second translucent electrodes 1511 to 1520 need to be reduced. Thus, it will be difficult to detect the object to be detected away from the detection surface of the active region 10. Consequently, the areas of the second translucent electrodes 1511 to 1520 should be large enough such that the distance D1 is ensured, and the areas of the second translucent electrodes 1521 to 1526, and 1531 to 1536 should be such that the position of the object to be detected can be detected, in a state in which the object to be detected comes into contact with an end part 1EL or an end part 1ER illustrated in FIG. 17, or in a state in which the object to be detected is near the end part 1EL or the end part 1ER enough so that the object to be detected can be considered the same as being in contact therewith (hereinafter, referred to as a "contact state"). Each of the areas of the second translucent electrodes 1521 to 1526, and 1531 to 1536 becomes smaller than each of the areas of the second translucent electrodes 1511 to 1520.

In the front surface panel 1 of the first embodiment, the second translucent electrodes 1521 to 1526 along the end part 1EL or the second translucent electrodes 1531 to 1536 along the end part 1ER are smaller than the second translucent electrodes 1511 to 1520 near the center of the active region 10. Consequently, when a finger or a hand of an operator comes into contact with the end part 1EL or the end part 1ER, the display device 100 of the first embodiment can detect that the object to be detected is touching one of the second translucent electrodes 1521 to 1526, and 1531 to 1536. Even when a finger or a hand of an operator touches the end part 1EL or the end part 1ER, the active region 10 will not be stained.

A state in which the object to be detected is not present at a position that faces the active region 10, or a state in which the object to be detected is away from the display surface such that the object to be detected cannot be detected by hover detection, is referred to as an "absence state". A state in which the object to be detected is present at a position that faces the detection surface or display surface, or a state in which the object to be detected is away from the display surface such that the object to be detected can be detected by hover detection, is referred to as a "presence state".

Figure 18:
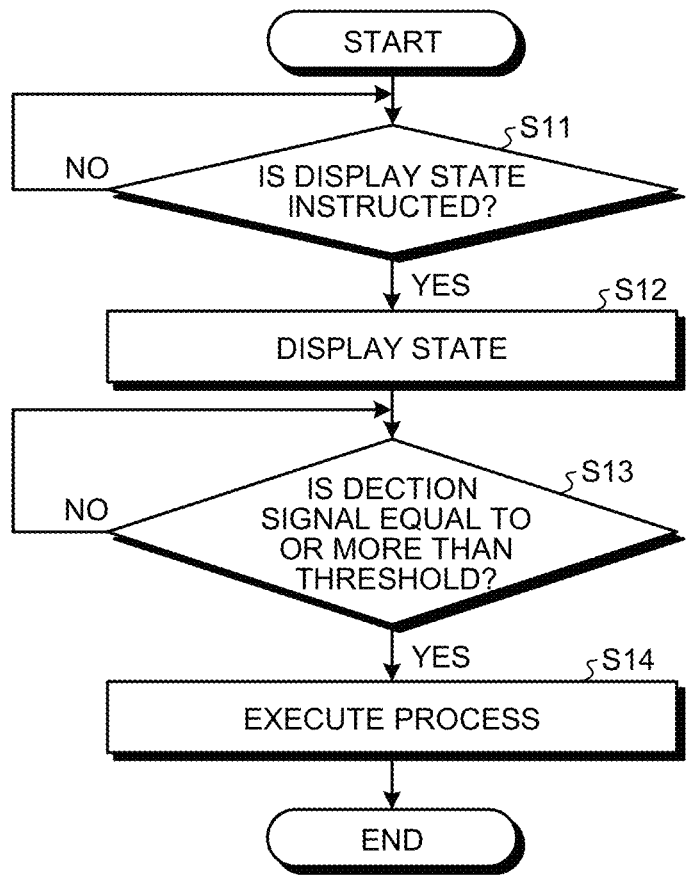
FIG. 18 is a flowchart for explaining an example of capacitance detection.
Figure 19:
FIG. 19 is a graph schematically illustrating a relation between detection electrode blocks and signal intensities.

FIG. 18 is a flowchart for explaining an example of capacitance detection. FIG. 19 is a graph schematically illustrating a relation between detection electrode blocks and signal intensities. When there is no instruction of the display state (No at step S11), the display device 100 waits for the instruction of the display state, while maintaining the reflective state. When there is an instruction of the display state (Yes at step S11), the display device 100 makes the front surface panel 1 in a display state (step S12).

Next, the detection signal drive unit 171C supplies the drive signal Vself to the second translucent electrodes 1511 to 1526, and 1531 to 1536 for a plurality of times. Then, it is determined whether the detection signals Vdet supplied from the second translucent electrodes 1511 to 1526, and 1531 to 1536 are equal to or more than a predetermined threshold $\Delta Vth$ illustrated in FIG. 19 (step S13). For example, as illustrated in FIG. 19, the detection circuit 172 calculates signal intensities of the detection signals Vdet supplied from the second translucent electrodes 1511 to 1526, and 1531 to 1536, and compares the calculated signal intensities with the predetermined threshold ΔVth.

Among the detection signals Vdet, when the signal intensity of any one of the detection signals Vdet is equal to or more than the threshold ΔVth (Yes at step S13), a predetermined process is executed (step S14). For example, if the hover detection is performed, and when the signal intensity of the detection signal Vdet of the second translucent electrode 1519 is equal to or more than the threshold ΔVth, the display device 100 makes the front surface panel 1 in a reflective state. When the object to be detected is touching any one of the second translucent electrodes 1521 to 1526, and 1531 to 1536 that are arranged along the end part 1EL or the end part 1ER illustrated in FIG. 17, and when the signal intensity of the detection signal Vdet of the second translucent electrode is equal to or more than the threshold ΔVth, the display device 100 changes the display brightness according to the position of the object to be detected.

As described above, the display device 100 includes the display panel 2 and the front surface panel 1. The front surface panel 1 is superimposed with the display panel 2, and is switched between the reflective state in which the incident light is reflected, and the transmissive state in which the incident light is transmitted. The front surface panel 1 outputs the detection signal Vdet corresponding to the presence of the object to be detected. Consequently, it is possible to detect the object to be detected, which is a nearby object, without further superimposing a touch panel. Because a touch panel is not further superimposed thereon, the front surface panel 1 of the first embodiment prevents the reflectivity in the reflective state from lowering.

In the first embodiment, the detection signal Vdet is output from the second translucent electrode 15. The detection signal Vdet may also be output from the first translucent electrode 14. However, because the second translucent electrode 15 is closer to the object to be detected than the first translucent electrode 14, it is possible to ensure the signal intensity when the detection signal Vdet is output from the second translucent electrode 15.

Second Embodiment

Figure 20:
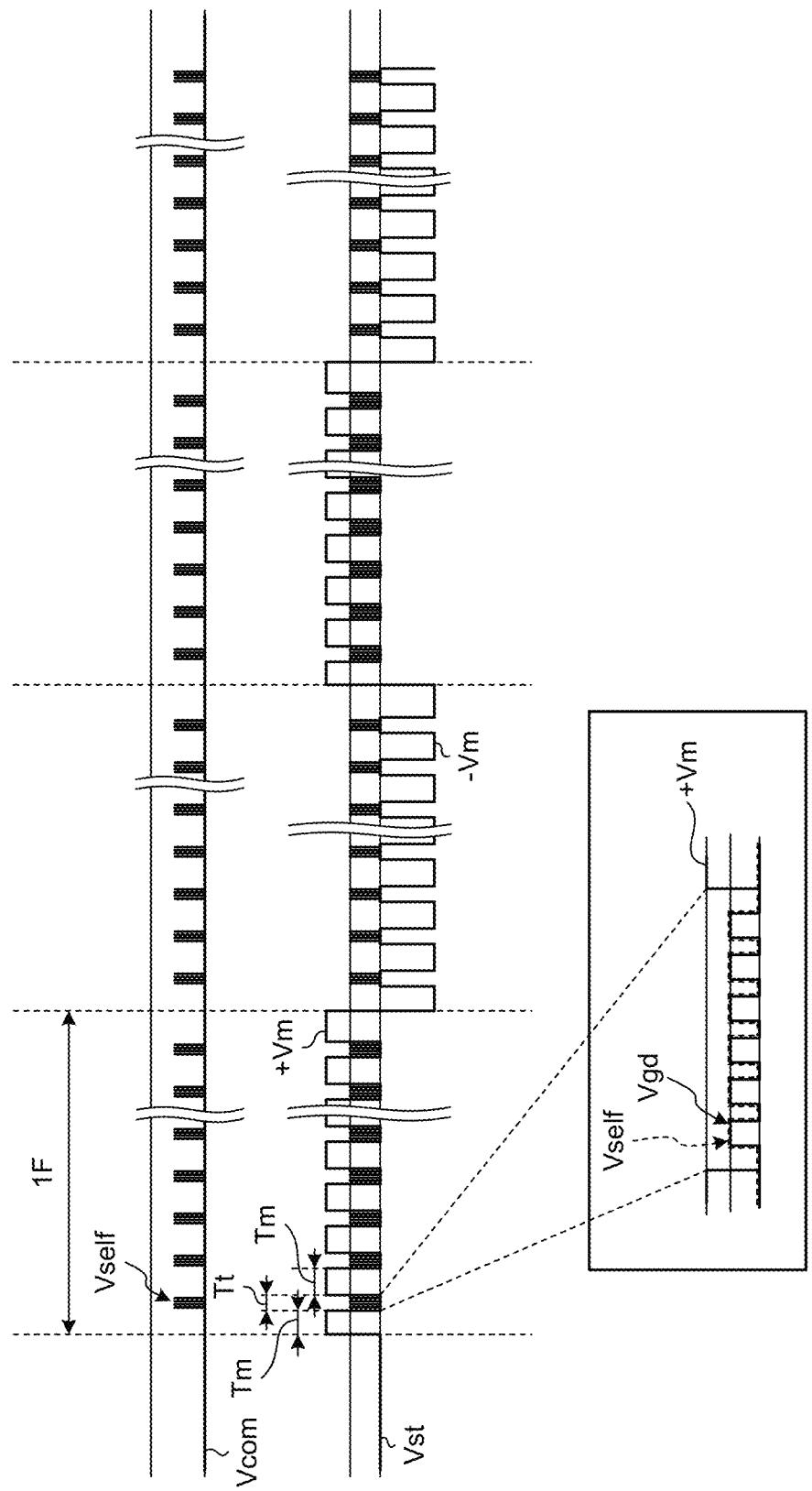
FIG. 20 is a timing chart of capacitance detection in a display state of a second embodiment.

FIG. 20 is a timing chart of capacitance detection in a display state of a second embodiment. The display device 100 of the second embodiment has the same configuration as that of the display device 100 in the first embodiment, except the guard signal Vgd illustrated in the timing chart. The same reference numerals denote the same components as those in the first embodiment, and the description thereof will be omitted.

As illustrated in FIG. 20, a display period Tt and a detection period Tm are alternately executed in a time-division manner. The order of executing the display period Tt and the detection period Tm is merely an example, and may be changed as appropriate. For example, the detection period Tm may be in the display period Tt of the first frame 1F, the detection period Tm may not be in the display period Tt in the next frame 1F, and the detection period Tm may be in the display period Tt in the subsequent frame 1F.

As illustrated in FIG. 20, the first translucent electrode drive unit 171A alternately supplies the reference voltage Vst and the drive signal Vm to the first translucent electrodes 1411 to 1426, and 1431 to 1436. The reference voltage Vst is supplied during the detection period Tm. The detection period Tm is a period much shorter than the response of the liquid crystal layer 19. Thus, the front surface panel 1 maintains the second front surface panel state. Even during the detection period Tm, the front surface panel 1 is in the transmissive state in which the incident light is transmitted, and can display an image on the display panel 2.

During the detection period Tm, the control circuit 171 supplies the drive signal Vself, which is an AC rectangular wave, to the second translucent electrodes 1511 to 1526, and 1531 to 1536. During the detection period Tm, the control circuit 171 supplies the guard signal Vgd, which is an AC rectangular wave, to the first translucent electrodes 1411 to 1426, and 1431 to 1436.

As described above, a second voltage that is the reference voltage Vst in the reflective state, that is different from the reference voltage Vst in the transmissive state, and that is based on the drive signal Vm, is applied to the first translucent electrode 14. At the timing when the drive signal Vself, which is an AC rectangular wave, is applied to the second translucent electrode 15, the reference voltage Vst is applied to the first translucent electrode 14, as well as the guard signal Vgd, which is an AC rectangular wave.

The guard signal Vgd is the same signal as the drive signal Vself. Consequently, the parasitic capacitances of the first translucent electrodes 1411 to 1426, and 1431 to 1436 coupled with those of the second translucent electrodes 1511 to 1526, and 1531 to 1536 are cancelled, and improves the signal-to-noise (SN) ratio of the detection signal Vdet of the second translucent electrodes 1511 to 1526, and 1531 to 1536.

Third Embodiment

Figure 21:
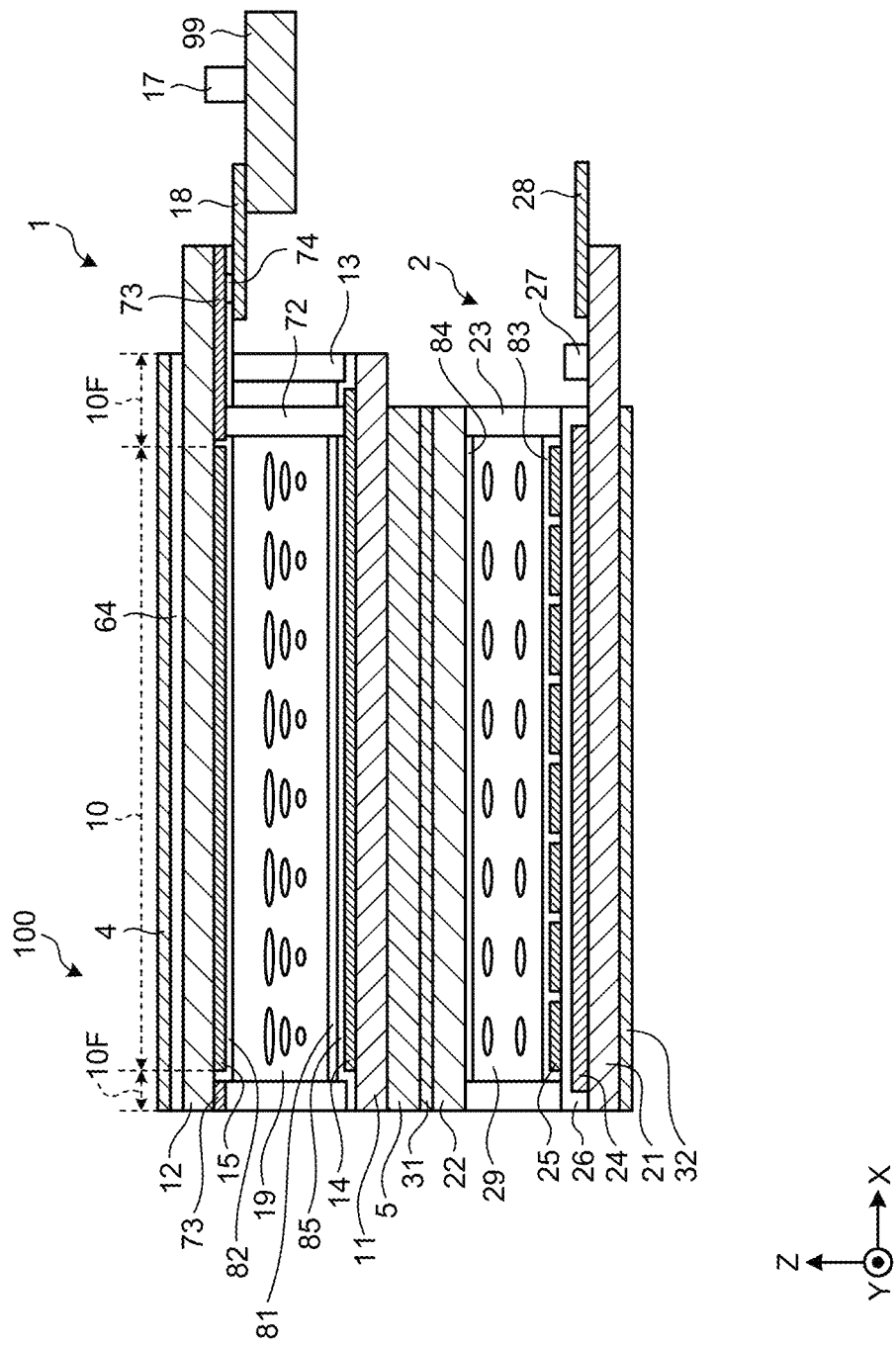
FIG. 21 is a sectional view of a display device of a third embodiment.

FIG. 21 is a sectional view of a display device of a third embodiment. The display device 100 of the third embodiment has a configuration different from that of the display device 100 of the first embodiment, in that the FPC 18 is coupled to the second substrate 12. The same reference numerals denote the same components as those in the first embodiment, and the description thereof will be omitted.

The FPC 18 is electrically coupled to the metal layer 73 of the second substrate 12 with the bonding pad 74. A part of the metal layer 73 is patterned as illustrated in FIG. 21, and serves as wiring for coupling a conductive column 72 electrically coupled to the first translucent electrode 14 with the bonding pad 74. The conductive column 72 electrically couples between the metal layer 73 and the first translucent electrode 14. The drive circuit 17 transmits the electrical power of the first translucent electrode 14 and the second translucent electrode 15 to the front surface panel 1 via the FPC 18. The other part of the metal layer 73 is arranged along the frame region 10F.

The metal layer 73 arranged along the frame region 10F is arranged so as to surround the periphery of the active region 10, and has a metallic luster. Thus, when viewed from the viewer's side, the metal layer 73 looks like a mirror surface. In other words, the light from the viewer's side is reflected by the metal layer 73. In the display device 100 of the third embodiment, when the active region 10 is in a reflective state, the frame region 10F is also in the reflective state. Thus, it looks as if the area of the mirror surface has increased.

Fourth Embodiment

Figure 22:
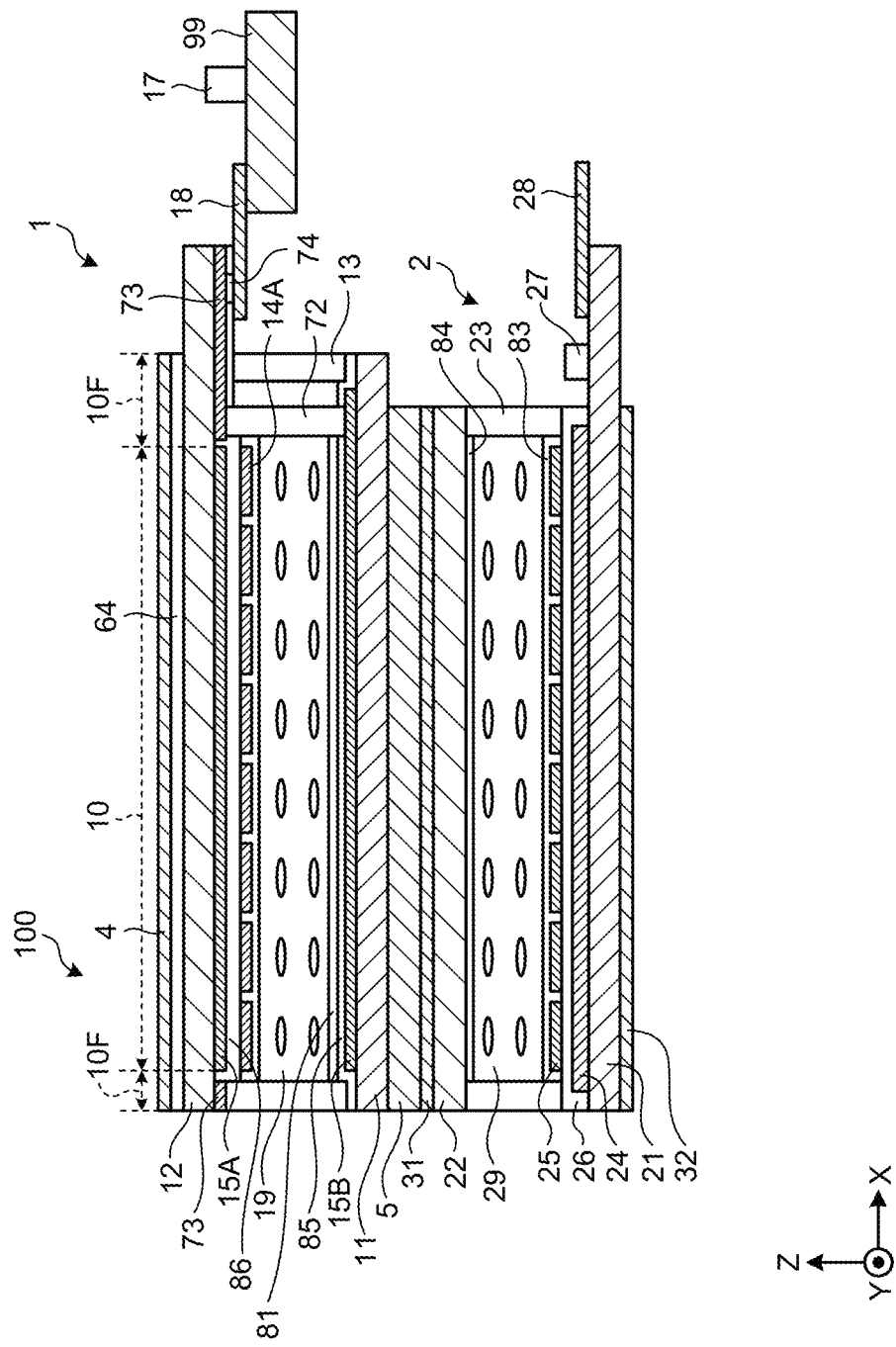
FIG. 22 is a sectional view of a display device of a fourth embodiment.

FIG. 22 is a sectional view of a display device of a fourth embodiment. The display device 100 of the fourth embodiment has a configuration different from that of the display device 100 in the third embodiment, in that the liquid crystal layer 19 is in a horizontal electric field mode such as the FFS, which is one mode of the IPS. The same reference numerals denote the same components as those in the third embodiment, and the description thereof will be omitted.

As illustrated in FIG. 3, a second translucent electrode 15A illustrated in FIG. 22 is divided into the second translucent electrodes 1511 to 1526, and 1531 to 1536. Slits are provided on a second translucent electrode 14A illustrated in FIG. 22, in what is called a comb-like manner.

As illustrated in FIG. 22, a third translucent electrode 15B is covered by the translucent insulating film 85 such as silicon nitride. The second translucent electrode 15A is covered by the translucent insulating film 86 such as silicon nitride.

Liquid crystals in the liquid crystal layer 19 that come into contact with the orientation film 81, which is interposed between the first substrate 11 and the liquid crystal layer 19, are oriented in a single direction. Similarly, liquid crystals in the liquid crystal layer 19 that come into contact with the orientation film 82, which is interposed between the second substrate 12 and the liquid crystal layer 19 and that covers the second translucent electrode 14A, are oriented in a direction different from the orientation of liquid crystals that come into contact with the first substrate 11.

The conductive column 72 electrically couples between the metal layer 73 and the third translucent electrode 15B. The drive circuit 17 supplies the drive signal Vcom to the third translucent electrode 15B via the FPC 18. When the drive circuit 17 applies a voltage to the first translucent electrode 14, a horizontal electric field is applied between the first translucent electrode 14 and the second translucent electrode 15. Consequently, the display device of the fourth embodiment can prevent yellowing, and improve visual field.

Fifth Embodiment

Figure 23:
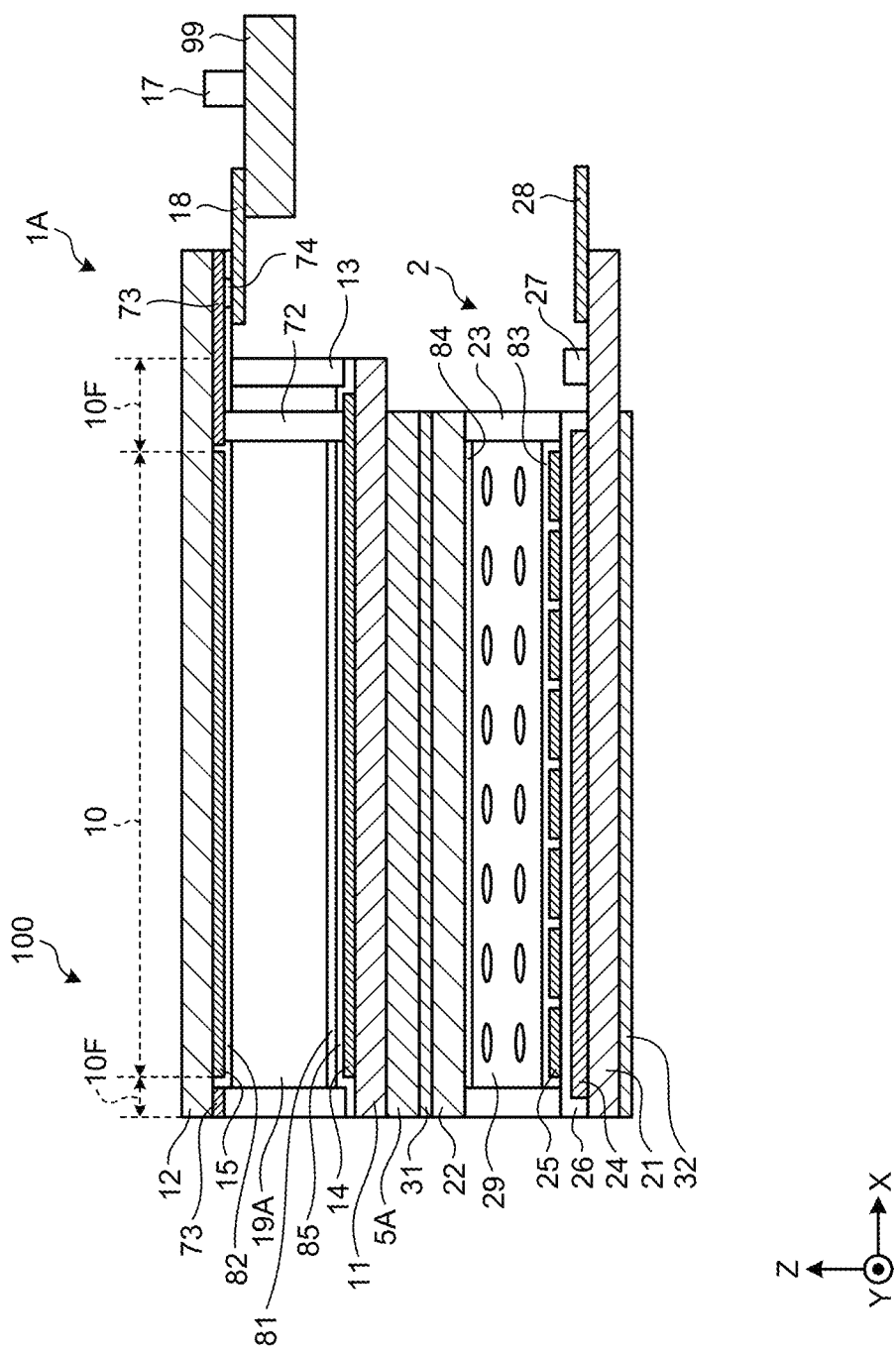
FIG. 23 is a sectional view of a display device of a fifth embodiment.

FIG. 23 is a sectional view of a display device of a fifth embodiment. The display device 100 of the fifth embodiment has a configuration different from that of the display device 100 in the third embodiment, in not including the liquid crystal layer 19 described above, and including an electrochromic layer 19A. The same reference numerals denote the same components as those in the third embodiment, and the description thereof will be omitted.

The electrochromic layer 19A includes a thin film made of an electrochromic material such as $WO_3$, $NbO_5$, and $TiO_2$, and electrolyte solution. Instead of using the optical sheet 5 in the third embodiment, a half mirror 5A is provided. Consequently, the display device of the fifth embodiment can prevent yellowing, and obtain visibility with a tint of blue.

While preferred embodiments of the present disclosure have been described above, the present disclosure is not limited to such embodiments. The description disclosed in the embodiments is merely an example, and various modifications may be made without departing from the gist of the present disclosure. Appropriate modifications made without departing from the gist of the present disclosure also naturally belong to the technical scope of the present disclosure. For example, translucent optical resin and various films, which do not suppress the effects brought about by the aspects described in the first embodiment, may also be provided between the first polarizing member 4, the optical sheet 5, the front surface panel 1, the second polarizing member 31, and the display panel 2 according to the embodiments described above.

Other functions and effects brought about by the aspects described in the first to fifth embodiments, which are apparent from the description of the present specification, or can be easily assumed by those skilled in the art, are naturally understood to be brought about by the present disclosure.

What is claimed is:

1. A display device comprising:
   a display panel; and
   a front surface panel that is capable of detecting presence of an object to be detected, the front surface panel being superimposed with the display panel, the front surface panel having a detection surface,
   wherein the front surface panel includes a first substrate,
      a second substrate that faces the first substrate, the first substrate being located between the display panel and the second substrate,
      a first translucent electrode that is capable of detecting the presence of the object to be detected, the first translucent electrode being provided on the first substrate, and
      a second translucent electrode that is capable of detecting the presence of the object to be detected, the second translucent electrode being divided into a plurality of electrodes and provided on the second substrate,
   wherein the electrodes include
      a center electrode disposed near a center of the front surface panel and an end electrode disposed near an end part of the front surface panel,
   the end electrode being smaller than the center electrode, and
   wherein the end electrode performs detection when the object to be detected is touching the end part of the detection surface in a contact state in which the object to be detected is near the detection surface enough to be considered the same as being in contact with the detection surface, and
   the center electrode performs hover detection while the object to be detected in a non-contact state in which the object to be detected is not near the detection surface enough to be considered the same as being in contact with the detection surface.

2. The display device according to claim 1, wherein the first translucent electrode is divided into a plurality of electrodes.

3. The display device according to claim 1, wherein
   an area of the end electrode that detects a position of the object to be detected in the contact state, is smaller than an area of the center electrode, which is large enough such that the center electrode is capable of performing the hover detection to detect the object away from the front of the detection surface by a predetermined distance in the non-contact state.

4. The display device according to claim 1, wherein an alternating current rectangular wave for detecting the presence of the object to be detected is applied to the second translucent electrode.

5. The display device according to claim 4, wherein
   the front surface panel is switched between a reflective state in which incident light is reflected and a transmissive state in which incident light is transmitted,
   same first voltage is applied to the second translucent electrode in the reflective state and the transmissive state, and
   in the transmissive state, the alternating current rectangular wave is superimposed on the first voltage.

6. The display device according to claim 4, wherein
the front surface panel is switched between a reflective state in which incident light is reflected and a transmissive state in which incident light is transmitted,
the first translucent electrode is a reference voltage in the reflective state, and in the transmissive state, a second voltage different from the reference voltage is applied to the first translucent electrode, and at a timing when the alternating current rectangular wave is applied to the second translucent electrode, the reference voltage, as well as a same signal as the alternating current rectangular wave, is applied to the first translucent electrode.

7. The display device according to claim 1, wherein the electrodes of the second translucent electrode are electrically coupled to an analog front end.

8. The display device according to claim 1, wherein a liquid crystal layer is provided between the first substrate and the second substrate.

9. The display device according to claim 8, wherein a vertical electric field is applied between the first translucent electrode and the second translucent electrode.

10. The display device according to claim 8, wherein a horizontal electric field is applied between the first translucent electrode and the second translucent electrode.

11. The display device according to claim 1, wherein an electrochromic layer is provided between the first substrate and the second substrate.

12. The display device according to claim 1,
wherein the front surface panel is switched between
a reflective state in which incident light is reflected and a transmissive state in which incident light is transmitted,
when there is an instruction of a display state, the display device makes the front surface panel to be the display state, and drive signals are supplied to the electrodes of the second translucent electrode, and then,
the hover detection is performed, and a signal intensity of any one of detection signals from a plurality of the center electrodes is equal to or more than a predetermined threshold, the display device makes the front surface panel in the reflective state.

13. The display device according to claim 1,
wherein, when there is an instruction of a display state, the display device makes the front surface panel to be the display state, and drive signals are supplied to the electrodes of the second translucent electrode, and then,
when the end electrode performs detection when the object is touching any one of positions corresponding to the end electrodes of the second translucent electrodes, and a signal intensity of the detection signal of any one of a plurality of the end electrodes is equal to or more than a threshold, the display device changes display brightness according to a position of the object to be detected.

14. An automobile including a mirror device the mirror device comprising:
a display device; and
an image pickup device that picks up the image,
the display device comprising:
a display panel; and
a front surface panel that is capable of detecting presence of an object to be detected, the front surface panel being superimposed with the display panel, the front surface panel having a detection surface,
wherein the front surface includes
a first substrate,
a second substrate that faces the first substrate, the first substrate being located between the display panel and the second substrate,
a first translucent electrode that is capable of detecting the presence of the object to be detected, the first translucent electrode being provided on the first substrate, and
a second translucent electrode that is capable of detecting the presence of the object to be detected, the second translucent electrode being divided into a plurality of electrodes and provided on the second substrate,
wherein the electrodes include
a center electrode disposed near a center of the first surface panel and an end electrode disposed near an end part of the front surface panel,
the end electrode being smaller than the center electrode, and
wherein the end electrode performs detection when the object to be detected is touching the end part of the detection surface in a contact state in which the object to be detected is near the detection surface enough to be considered the same as being in contact with the detection surface, and
the center electrode performs hover detection while the object to be detected in a non-contact state in which the object to be detected is not near the detection surface enough to be considered the same as being in contact with the detection surface.

\* \* \* \* \*